United States Patent
Saito et al.

(10) Patent No.: US 12,497,679 B2
(45) Date of Patent: Dec. 16, 2025

(54) Zn—Al—Mg PLATED CHECKERED STEEL PLATE

(71) Applicant: NIPPON STEEL CORPORATION, Tokyo (JP)

(72) Inventors: Mamoru Saito, Tokyo (JP); Yasuto Goto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 152 days.

(21) Appl. No.: 18/553,206

(22) PCT Filed: Apr. 5, 2022

(86) PCT No.: PCT/JP2022/017109
§ 371 (c)(1),
(2) Date: Sep. 29, 2023

(87) PCT Pub. No.: WO2022/215694
PCT Pub. Date: Oct. 13, 2022

(65) Prior Publication Data
US 2024/0183018 A1    Jun. 6, 2024

(30) Foreign Application Priority Data
Apr. 6, 2021 (JP) .................................. 2021-064721

(51) Int. Cl.
*B32B 15/01* (2006.01)
*C21D 8/02* (2006.01)
(Continued)

(52) U.S. Cl.
CPC .............. *C23C 2/06* (2013.01); *C21D 8/0226* (2013.01); *C21D 9/46* (2013.01); *C22C 18/04* (2013.01);
(Continued)

(58) Field of Classification Search
None
See application file for complete search history.

(56) References Cited

FOREIGN PATENT DOCUMENTS

| CN | 111094613 A | 5/2020 |
|----|-------------|--------|
| JP | 2743774 B2 | 4/1998 |

(Continued)

*Primary Examiner* — Daniel J. Schleis
(74) *Attorney, Agent, or Firm* — SOLARIS Intellectual Property Group, PLLC

(57) ABSTRACT

Provided is a Zn—Al—Mg alloy coated checkered steel sheet having on the sheet surface thereof convex part and flat part, wherein: the coating layer has a predetermined chemical composition, and when observing a cross section of cutting edge orthogonal to a longitudinal direction of the convex part and taken along a sheet thickness direction at a central part in the longitudinal direction of the convex part, a layer thickness ratio of the coating layer of the flat part on left and right of the convex part (layer thickness of left coating layer/layer thickness of right coating layer) is from 0.2 to 5.0, and a convex height T−t, where T is a sheet thickness of the substrate checkered steel sheet at the convex part and t is a sheet thickness of the substrate checkered steel sheet at the flat part, and a gap height x between a stationary surface and a sheet surface of the coated checkered steel sheet opposite to the stationary surface in a case in which the coated checkered steel sheet is placed in a stationary position satisfy the following Formulas 1 and 2 below.

$x/(T-t) \leq 1.5$    Formula 1:

$0.5 < T-t \leq t$    Formula 2:

4 Claims, 6 Drawing Sheets

(51) Int. Cl.
*C21D 9/46* (2006.01)
*C22C 18/04* (2006.01)
*C23C 2/06* (2006.01)
*C23C 2/26* (2006.01)
*C23C 2/40* (2006.01)
*C23C 30/00* (2006.01)

(52) U.S. Cl.
CPC ................ *C23C 2/261* (2022.08); *C23C 2/40* (2013.01); *C23C 30/00* (2013.01)

(56) References Cited

FOREIGN PATENT DOCUMENTS

| | | | |
|---|---|---|---|
| JP | 2018053288 A | * | 4/2018 |
| KR | 10-2020-0044936 A | | 4/2020 |
| WO | 2019/054483 A1 | | 3/2019 |

\* cited by examiner

Zn—Al—Mg PLATED CHECKERED STEEL PLATE

TECHNICAL FIELD

The present disclosure relates to a Zn—Al—Mg alloy coated checkered steel sheet.

BACKGROUND ART

A checkered steel sheet is a steel sheet having continuous non-slip convex part (that is, protrusions) on surface by rolling. In general, convex part having a constant width, a constant length, and a constant height are provided at a constant angle and a constant pitch with respect to a rolling direction. Typically, checkered steel sheets are manufactured by hot rolling. Checkered steel sheets are used for floor boards or steps of large vehicles (bus, track, etc.), floor boards of multistory parking lots, floor boards of factories, decks of ships, temporary scaffoldings or stairs in construction sites, and the like.

For example, Patent Literature 1 discloses "A hot-dip coated checkered steel sheet including: a substrate material steel sheet; a Ni coating layer disposed on a surface of the substrate material steel sheet; and a hot-dip coating layer disposed on a surface of the Ni coating layer, the hot-dip coated checkered steel sheet having a convex part and a flat surface part on a sheet surface, wherein a film thickness of the Ni coating layer of the convex part is from 0.07 µm to 0.4 µm per one surface, a film thickness of the Ni coating layer of the flat surface part is from 0.05 µm to 0.35 µm per one surface, the film thickness of the Ni coating layer of the convex part is greater than 100% and 400% or less with respect to the film thickness of the Ni coating layer of the flat surface part, a deposited amount of the hot-dip coating layer is from 60 g/m$^2$ to 400 g/m$^2$ per one surface, and the hot-dip coating layer contains, % by mass, Al: greater than 1.0% and 26% or less, Mg: from 0.05% to 10%, Si: from 0% to 1.0%, Sn: from 0% to 3.0%, and Ca: from 0% to 1.0% as a chemical composition, the hot-dip coated checkered steel sheet including Zn and impurities as a remnant."

In addition, Patent Literature 2 discloses "A continuous hot-dip metal coating method for a strip-shaped checkered steel sheet, the method including: subjecting the strip-shaped checkered steel sheet to a pickling treatment; and then continuously subjecting the strip-shaped checkered steel sheet to hot-dip metal coating under conditions that satisfy the requirements of an annealing temperature of from 450° C. to 850° C., a steel strip tension in an annealing furnace of from 0.3 kg/mm$^2$ to 2.0 kg/mm$^2$, a steel strip tension in a coating line of from 0.3 kg/mm$^2$ to 3.0 kg/mm$^2$, and a gas pressure for hot-dip metal wiping of from 0.02 kg/cm$^2$ to 1.5 kg/cm$^2$."

CITED DOCUMENTS

Patent Literature

Patent Literature 1: WO 2019/054483 A
Patent Literature 2: Japanese Patent No. 2743774

SUMMARY OF INVENTION

Technical Problem

Since a checkered steel sheet is often used outdoors, corrosion resistance is required. Therefore, as disclosed in Patent Document 1 to 2, in order to improve corrosion resistance, hot-dip coating is applied to the checkered steel sheet.

On the other hand, since the checkered steel sheet is used for scaffolding, anti-slip, and the like, flatness is also required.

However, the checkered steel sheet is a steel sheet having a local difference of sheet thickness due to a convex part and a flat part. Therefore, in order to improve corrosion resistance, when hot-dip coating is performed on the checkered steel sheet, a difference occurs in an expansion amount and a shrinkage amount due to a temperature change between the convex part and the flat part of the checkered steel sheet, and the checkered steel sheet is deformed. In a case in which the deformed coated checkered steel sheet is formed into a product, flatness is deteriorated. In addition, when the flatness is deteriorated, variations in the layer thickness of the coating layer occur, and corrosion resistance and formability are deteriorated.

In particular, since a Zn—Al—Mg alloy coating bath has a lower viscosity than a Zn-based coating bath, when the flatness of the checkered steel sheet is deteriorated, the layer thickness of the coating layer tends to vary, and corrosion resistance and formability are deteriorated. Therefore, the Zn—Al—Mg alloy coated checkered steel sheet is required to have further improved flatness.

Thus, an object of the present disclosure is to provide a Zn—Al—Mg alloy coated checkered steel sheet having excellent flatness, corrosion resistance, and formability.

Solution to Problem

The above object is achieved by the following means.
<1>
A Zn—Al—Mg alloy coated checkered steel sheet including:
  a substrate checkered steel sheet having a convex part and a flat part on one sheet surface; and
  a coating layer including a Zn—Al—Mg alloy layer disposed on the sheet surface of the substrate checkered steel sheet having the convex part and the flat part,
  wherein the coating layer has a chemical composition containing, in % by mass:
  Zn: greater than 65.0%,
  Al: from greater than 1.0% to less than 25.0%,
  Mg: from greater than 1.0% to less than 12.5%,
  Sn: from 0% to 5.0%,
  Bi: from 0% to less than 5.0%,
  In: from 0% to less than 2.0%,
  Ca: from 0% to 3.00%,
  Y: from 0% to 0.5%,
  La: from 0% to less than 0.5%,
  Ce: from 0% to less than 0.5%,
  Si: from 0% to less than 2.5%,
  Cr: from 0% to less than 0.25%,
  Ti: from 0% to less than 0.25%,
  Zr: from 0% to less than 0.25%,
  Mo: from 0% to less than 0.25%,
  W: from 0% to less than 0.25%,
  Ag: from 0% to less than 0.25%,
  P: from 0% to less than 0.25%,
  Ni: from 0% to less than 0.25%,
  Co: from 0% to less than 0.25%,
  V: from 0% to less than 0.25%,
  Nb: from 0% to less than 0.25%,
  Cu: from 0% to less than 0.25%,
  Mn: from 0% to less than 0.25%, Li: from 0% to less than 0.25%,
Na: from 0% to less than 0.25%,
K: from 0% to less than 0.25%,
Fe: from 0% to 5.0%,
Sr: from 0% to less than 0.5%,
Sb: from 0% to less than 0.5%,
Pb: from 0% to less than 0.5%,
B: from 0% to less than 0.5%, and
impurities,
wherein when observing a cross section of cutting edge orthogonal to a longitudinal direction of the convex part and taken along a sheet thickness direction at a central part in the longitudinal direction of the convex part, a layer thickness ratio of the coating layer of the flat part on left and right sides of the convex part (layer thickness of left coating layer/layer thickness of right coating layer) is from 0.2 to 5.0, and
wherein a convex height T−t, where T is a sheet thickness of the substrate checkered steel sheet at the convex part and t is a sheet thickness of the substrate checkered steel sheet at the flat part, and a gap height x between a stationary surface and a sheet surface of the coated checkered steel sheet opposing the stationary surface in a case in which the coated checkered steel sheet is placed in a stationary position satisfy the following Formulae 1 and 2 below.

$$x/(T-t) \leq 1.5 \qquad \text{Formula 1:}$$

$$0.5 < T-t \leq t \qquad \text{Formula 2:}$$

In Formula 1 and Formula 2, units of the sheet thicknesses T and t and the gap height x of the substrate checkered steel sheet are millimeters.

<2>

The Zn—Al—Mg alloy coated checkered steel sheet according to <1>, wherein the Al concentration is greater than 5.0% and to less than 25.0%, and the Mg concentration is greater than 3.0% and less than 12.5%.

<3>

The Zn—Al—Mg alloy coated checkered steel sheet according to <1> or <2>, wherein the coating layer includes an Al—Fe alloy layer between the substrate checkered steel sheet and the Zn—Al—Mg alloy layer.

Advantageous Effects of Invention

According to the present disclosure, it is possible to provide a Zn—Al—Mg alloy coated checkered steel sheet excellent in flatness, corrosion resistance, and formability.

DESCRIPTION OF EMBODIMENTS

Figure 1A:
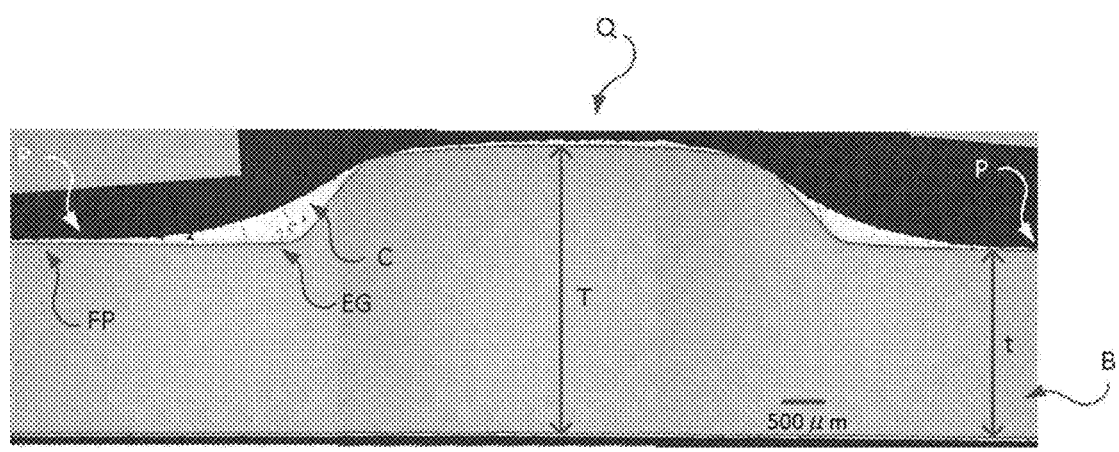
FIG. 1A is a SEM photograph (500 times) showing an example of a cross section of cutting edge of a Zn—Al—Mg alloy coated checkered steel sheet according to the present disclosure.

An example of the disclosure will be described hereinafter.

In the disclosure, the expression "%" with respect to the content of each element of a chemical composition means "% by mass".

Numerical ranges expressed by using "to" mean ranges in which the numerical values described before and after the "to" are included as the lower limit and the upper limit.

Numerical ranges in cases in which "greater than" or "less than" accompanies a numerical value before or after the "to" mean ranges that do not include the value as the lower limit or the upper limit.

The content of an element in a chemical composition may be expressed as an element concentration (for example, Zn concentration and Mg concentration).

A Zn—Al—Mg alloy coated checkered steel sheet (hereinafter, also simply referred to as "coated checkered steel sheet") according to the present disclosure is a coated checkered steel sheet including: a substrate checkered steel sheet in which convex part and flat part are provided on one sheet surface; and a coating layer including a Zn—Al—Mg alloy layer disposed on the sheet surface of the substrate checkered steel sheet in which the convex part and the flat part are provided.

In the coated checkered steel sheet according to the present disclosure, the coating layer has a predetermined chemical composition, and when observing a cross section of cutting edge orthogonal to a longitudinal direction of the convex part and taken along a sheet thickness direction at a central part in the longitudinal direction of the convex part, a layer thickness ratio of the coating layer of the flat part on left and right sides of the convex part (layer thickness of left coating layer/layer thickness of right coating layer) is from 0.2 to 5.0, and a convex height T−t, where T is a sheet thickness of the substrate checkered steel sheet at the convex part and t is a sheet thickness of the substrate checkered steel sheet at the flat part, and a gap height x between a stationary surface and a sheet surface of the coated checkered steel sheet opposing the stationary surface in a case in which the coated checkered steel sheet is placed in a stationary position satisfy the following Formulae 1 and 2 below.

$$x/(T-t) \leq 1.5 \qquad \text{Formula 1:}$$

$$0.5 < T-t \leq t \qquad \text{Formula 2:}$$

In Formula 1 and Formula 2, units of the sheet thicknesses T and t and the gap height x of the substrate checkered steel sheet are millimeters.

With the above configuration, the coated checkered steel sheet according to the present disclosure is a Zn—Al—Mg alloy coated checkered steel sheet excellent in flatness, corrosion resistance, and formability. The coated checkered steel sheet according to the present disclosure has been found from the following findings.

The inventors have studied to further increase flatness and suppress a variation in the layer thickness of the coating layer even in the Zn—Al—Mg alloy coating having a lower viscosity than a Zn-based coating bath. As a result, the following findings have been obtained.

A deterioration in flatness of a coated checkered steel sheet affects not only a heating temperature of a substrate checkered steel sheet before immersion in a coating bath but also a heating rate and a cooling rate. Specifically, when a hot-dip coating is performed on the substrate checkered steel sheet, even in a case in which the substrate checkered steel sheet is rapidly heated and cooled before immersion in the coating bath, a difference occurs in an expansion amount and a shrinkage amount due to a rapid temperature change between a convex part and a flat part having different sheet thicknesses, and the substrate checkered steel sheet is deformed. This is because, when the substrate checkered steel sheet is heated and cooled before immersion, unlike a normal flat steel sheet, a difference occurs in a heating rate and a cooling rate between the convex part and the flat part of the substrate checkered steel sheet.

Therefore, when heating and cooling of the substrate checkered steel sheet before immersion in the coating bath are performed at a slow heating rate and a slow cooling rate, a difference in heating rate and cooling rate is less likely to occur between the convex part and the flat part having different sheet thicknesses. Thereby, the convex part and the flat part are heated and cooled as uniformly as possible, and deformation is suppressed. As a result, flatness of the substrate checkered steel sheet is further improved, and even in the Zn—Al—Mg alloy coating, variation in the layer thickness of the coating layer is reduced, and corrosion resistance and formability are improved.

That is, the inventors have found that a Zn—Al—Mg alloy coated checkered steel sheet satisfying a layer thickness ratio of the coating layer of the flat part and the above Formulae 1 and 2 can be obtained.

From the above findings, it has been found that the coated checkered steel sheet according to the present disclosure is a Zn—Al—Mg alloy coated checkered steel sheet excellent in flatness, corrosion resistance, and formability.

Details of a coated checkered steel sheet according to the disclosure will be described hereinafter.

(Substrate Checkered Steel Sheet)

A substrate checkered steel sheet is a steel sheet subject to coating. In the substrate checkered steel sheet, convex part and flat part are provided on one sheet surface.

The substrate checkered steel sheet is usually provided with a shape of a convex part by hot rolling. A steel type of the substrate checkered steel sheet is not particularly limited. Examples of the substrate checkered steel sheet include a steel type corresponding to a rolled steel material for general structure defined in JIS G3101:2015.

A convex shape of the substrate checkered steel sheet is imparted, for example, by transferring a concave shape formed on a working roll to a steel sheet surface at a finishing stage of hot rolling.

A sheet surface on an opposite side facing the sheet surface provided with the convex part and the flat part in a sheet thickness direction is a surface having a surface property of a normal steel sheet. Specifically, the sheet surface on the opposite side facing the sheet surface provided with the convex part and the flat part in the sheet thickness direction is, for example, a sheet surface applied by a normal rolling roll (that is, a roll having normal roughness) facing an operating roll on which the convex part and the flat part are provided at the finishing stage of hot rolling.

The substrate checkered steel sheet may be a pre-coated pre-coated checkered steel sheet. The pre-coated checkered steel sheet is obtained by, for example, an electrolytic treatment method or a displacement coating method. In the electrolytic treatment method, a pre-coated checkered steel sheet is obtained by immersing a substrate checkered steel sheet in a sulfate bath or a chloride bath that contains metal ions of various pre-coating components and carrying out an electrolytic treatment. In the displacement coating method, a pre-coated checkered steel sheet is obtained by immersing a substrate checkered steel sheet in an aqueous solution that contains metal ions of various pre-coating components and whose pH is adjusted with sulfuric acid, and effecting displacement precipitation of the metals.

A Ni pre-coated checkered steel sheet is a representative example of a pre-coated checkered steel sheet.

(Coating Layer)

The coating layer includes a Zn—Al—Mg alloy layer. The coating layer may include an Al—Fe alloy layer in addition to the Zn—Al—Mg alloy layer. The Al—Fe alloy layer exists between the substrate checkered steel sheet and the Zn—Al—Mg alloy layer.

That is, the coating layer may have a single-layer structure of a Zn—Al—Mg alloy layer or a multilayer structure including a Zn—Al—Mg alloy layer and an Al—Fe alloy layer. In the case of the multilayer structure, the Zn—Al—Mg alloy layer is preferably a layer constituting the surface of the coating layer.

However, although an oxide film of an element constituting the coating layer may be formed to about 50 nm on a surface of the coating layer, the oxide film is thin with respect to a thickness of the entire coating layer and considered not to constitute a main subject of the coating layer.

A deposited amount of the coating layer is preferably from 60 g/m$^2$ to 500 g/m$^2$ on one surface.

When the deposited amount of the coating layer is 60 g/m$^2$ or more, corrosion resistance can be secured more reliably. When the deposited amount of the coating layer is 500 g/m$^2$ or less, appearance defects such as sagging patterns of the coating layer can be suppressed.

Next, the chemical composition of the coating layer will be described.

The chemical composition of the coating layer shall be as follows, in % by mass,
  Zn: greater than 65.0%,
  Al: from greater than 1.0% to less than 25.0%,
  Mg: from greater than 1.0% to less than 12.5%,
  Sn: from 0% to 5.0%,
  Bi: from 0% to less than 5.0%,
  In: from 0% to less than 2.0%,
  Ca: from 0% to 3.00%,
  Y: from 0% to 0.5%,
  La: from 0% to less than 0.5%,
  Ce: from 0% to less than 0.5%,
  Si: from 0% to less than 2.5%,
  Cr: from 0% to less than 0.25%,
  Ti: from 0% to less than 0.25%,
  Zr: from 0% to less than 0.25%,
  Mo: from 0% to less than 0.25%,
  W: from 0% to less than 0.25%,
  Ag: from 0% to less than 0.25%,
  P: from 0% to less than 0.25%,
  Ni: from 0% to less than 0.25%,
  Co: from 0% to less than 0.25%, V: from 0% to less than 0.25%,
Nb: from 0% to less than 0.25%,
Cu: from 0% to less than 0.25%,
Mn: from 0% to less than 0.25%,
Li: from 0% to less than 0.25%,
Na: from 0% to less than 0.25%,
K: from 0% to less than 0.25%,
Fe: from 0% to 5.0%,
Sr: from 0% to less than 0.5%,
Sb: from 0% to less than 0.5%,
Pb: from 0% to less than 0.5%,
B: from 0% to less than 0.5%, and
impurities.

In the chemical composition of the coating layer, Sn, Bi, In, Ca, Y, La, Ce, Si, Cr, Ti, Zr, Mo, W, Ag, P, Ni, Co, V, Nb, Cu, Mn, Li, Na, K, Fe, Sr, Sb, Pb, and B are optional components. That is, these elements need not be contained in the coating layer. When any of these optional components are contained, the content of each optional element is preferably in the range described below.

Here, the chemical composition of this coating layer is the average chemical composition of the entire coating layer (in a case in which the coating layer has a single-layer structure of a Zn—Al—Mg alloy layer, the average chemical composition of the Zn—Al—Mg alloy layer, and in a case in which the coating layer has a multilayer structure of an Al—Fe alloy layer and a Zn—Al—Mg alloy layer, the total average chemical composition of the Al—Fe alloy layer and the Zn—Al—Mg alloy layer).

Usually, in the hot-dip coating method, the chemical composition of the Zn—Al—Mg alloy layer is almost the same as the chemical composition of the coating bath because the formation reaction of the coating layer is almost completed in the coating bath. In the hot-dip coating method, the Al—Fe alloy layer is instantaneously formed and grown immediately after immersion in the coating bath. The formation reaction of the Al—Fe alloy layer is completed in the coating bath, and the thickness of the Al—Fe alloy layer is often sufficiently smaller than that of the Zn—Al—Mg alloy layer.

Therefore, unless a special heat treatment such as a heat alloying treatment is performed after coating, the average chemical composition of the entire coating layer is substantially equal to the chemical composition of the Zn—Al—Mg alloy layer, and the components of the Al—Fe alloy layer can be ignored.

Hereinafter, each element of the coating layer will be described.

Zn: Greater than 65.0%

Zn is an element necessary for obtaining corrosion resistance. With regard to a Zn concentration, when considered in an atomic composition ratio, Zn is required to occupy the main subject also in the atomic composition ratio because the coating layer is composed together with elements having a low specific gravity such as Al and Mg.

Accordingly, the Zn concentration is set to greater than 65.0%. The Zn concentration is preferably 70% or more. The upper limit of the Zn concentration is a remnant concentration excluding elements other than Zn, and impurities.

Al: Greater than 1.0% to Less than 25.0%

Al is an essential element for forming Al crystals and securing corrosion resistance. Also, Al is an essential element for enhancing adhesion of the coating layer and ensuring formability. Accordingly, the lower limit of an Al concentration is set to greater than 1.0% (preferably greater than 5.0%, more preferably 10.0% or more).

When the Al concentration is excessively increased, the corrosion resistance tends to deteriorate. Accordingly, the upper limit of the Al concentration is set to less than 25.0% (preferably 23.0% or less).

Mg: Greater than 1.0% to Less than 12.5%

Mg is an essential element for ensuring corrosion resistance. Accordingly, the lower limit of a Mg concentration is set to greater than 1.0% (preferably greater than 3.0%, more preferably greater than 5.0%).

When the Mg concentration excessively increases, the formability tends to deteriorate. Accordingly, the upper limit of the Mg concentration is set to less than 12.5% (preferably 10.0% or less).

Sn: From 0% to 5.0%

Sn is an element for contributing to corrosion resistance. Accordingly, the lower limit of a Sn concentration is preferably greater than 0% (preferably 0.1% or more, and more preferably 0.5% or more).

When the Sn concentration is excessively increased, corrosion resistance tends to deteriorate. Accordingly, the upper limit of the Sn concentration is set to 5.0% or less (preferably 3.0% or less).

Bi: From 0% to Less than 5.0%

Bi is an element for contributing to corrosion resistance. Accordingly, the lower limit of the Bi concentration is preferably greater than 0% (more preferably 0.1% or more, and still more preferably 3.0% or more).

When the Bi concentration is excessively increased, corrosion resistance tends to deteriorate. Accordingly, the upper limit of the Bi concentration is set to less than 5.0% (preferably 4.8% or less).

In: From 0% to Less than 2.0%

In is an element for contributing to corrosion resistance. Accordingly, the lower limit of the In concentration is preferably greater than 0% (more preferably 0.1% or more, and still more preferably 1.0% or more).

When the In concentration is excessively increased, corrosion resistance tends to deteriorate. Accordingly, the upper limit of the In concentration is set to less than 2.0% (preferably 1.8% or less).

Ca: From 0% to 3.0%

Ca is an element capable of adjusting the optimum Mg elution amount for imparting corrosion resistance. Accordingly, the lower limit of the Ca concentration is preferably greater than 0% (more preferably 0.05% or more).

When the Ca concentration is excessively increased, corrosion resistance and formability tend to deteriorate. Accordingly, the upper limit of the Ca concentration is set to 3.0% or less (preferably 1.0% or less).

Y: From 0% to 0.5%

Y is an element for contributing to corrosion resistance. Accordingly, the lower limit of the Y concentration is preferably greater than 0% (more preferably 0.1% or more).

When the Y concentration is excessively increased, corrosion resistance tends to deteriorate. Accordingly, the upper limit of the Y concentration is set to 0.5% or less (preferably 0.3% or less).

La and Ce: From 0% to Less than 0.5%

La and Ce are elements for contributing to corrosion resistance. Accordingly, the lower limit of each of the La concentration and the Ce concentration is preferably greater than 0% (more preferably 0.1% or more).

When the La concentration and the Ce concentration are excessively increased, corrosion resistance tends to deteriorate. Accordingly, the upper limit of each of the La concentration and the Ce concentration is set to less than 0.5% (preferably 0.4% or less).

Si: From 0% to Less than 2.5%

Si is an element that suppresses growth of the Al—Fe alloy layer and contributes to improvement of the corrosion resistance. Accordingly, the Si concentration is preferably greater than 0% (more preferably 0.05% or more, and still more preferably 0.1% or more). In particular, when Sn is not contained (that is, when the Sn concentration is 0%), the Si concentration is preferably 0.1% or more (preferably 0.2% or more) from a viewpoint of securing corrosion resistance.

When the Si concentration is excessively increased, corrosion resistance and formability tend to deteriorate. Accordingly, the upper limit of the Si concentration is set to less than 2.5%. In particular, from the viewpoint of corrosion resistance, the Si concentration is preferably 2.4% or less, more preferably 1.8% or less, and still more preferably 1.2% or less.

Cr, Ti, Zr, Mo, W, Ag, P, Ni, Co, V, Nb, Cu, Mn, Li, Na, and K: 0% to Less than 0.25%

Cr, Ti, Zr, Mo, W, Ag, P, Ni, Co, V, Nb, Cu, Mn, Li, Na, and K are elements contributing to corrosion resistance. Accordingly, the lower limit values of the concentrations of Cr, Ti, Zr, Mo, W, Ag, P, Ni, Co, V, Nb, Cu, Mn, Li, Na and K are each preferably greater than 0% (preferably 0.05% or more, more preferably 0.1% or more).

When the concentrations of Cr, Ti, Zr, Mo, W, Ag, P, Ni, Co, V, Nb, Cu, Mn, Li, Na, and K are excessively increased, corrosion resistance tends to deteriorate. Accordingly, the upper limit values of the concentrations of Cr, Ti, Zr, Mo, W, Ag, P, Ni, Co, V, Nb, Cu, Mn, Li, Na, and K are each less than 0.25%. The upper limit values of the concentrations of Cr, Ti, Zr, Mo, W, Ag, P, Ni, Co, V, Nb, Cu, Mn, Li, Na, and K are preferably 0.22% or less.

Fe: From 0% to 5.0%

In a case in which the coating layer is formed by a hot-dip coating method, certain amounts of Fe concentration are contained in the Zn—Al—Mg alloy layer and the Al—Fe alloy layer.

It has been confirmed that there are no adverse effects on the performances even when Fe is contained in the coating layer (in particular, Zn—Al—Mg alloy layer) up to a concentration of 5.0%. Since most of the Fe is contained in the Al—Fe alloy layer in many cases, the Fe concentration is generally high when the thickness of this layer is large.

Sr, Sb, Pb, and B: From 0% to Less than 0.5%

Sr, Sb, Pb, and B are elements for contributing to corrosion resistance. Accordingly, the lower limit of each of the Sr, Sb, Pb, and B concentrations is preferably greater than 0% (more preferably 0.05% or more, and still more preferably 0.1% or more).

When the concentrations of Sr, Sb, Pb, and B are excessively increased, corrosion resistance tends to deteriorate. Accordingly, the upper limit of each of the Sr, Sb, Pb, and B concentrations is set to less than 0.5%.

Impurities

The impurities refer to components contained in the raw materials or components that are mixed in the manufacturing step and not intentionally contained. For example, in the coating layer, trace amounts of components other than Fe may be mixed as impurities due to mutual atomic diffusion between the substrate checkered steel sheet and the coating bath.

The chemical components of the coating layer are measured by the following method.

First, an acid solution in which the coating layer has been peeled off and dissolved with an acid containing an inhibitor that inhibits corrosion of the substrate checkered steel sheet is obtained. Next, the obtained acid solution is measured by an ICP analysis, whereby the chemical composition of the coating layer (in a case in which the coating layer has a single-layer structure of a Zn—Al—Mg alloy layer, the chemical composition of the Zn—Al—Mg alloy layer, in a case in which the coating layer has a multilayer structure of an Al—Fe alloy layer and a Zn—Al—Mg alloy layer, the total chemical composition of the Al—Fe alloy layer and the Zn—Al—Mg alloy layer) can be obtained. The kind of the acid is not particularly limited as long as it is an acid capable of dissolving the coating layer. The chemical composition is measured as the average chemical composition. In ICP analysis, the Zn concentration is determined according to "Formula (a): Zn concentration=100%−concentrations (%) of other elements".

Here, in a case in which a pre-coated checkered steel sheet is used as the substrate checkered steel sheet, the components of the pre-coating are also detected.

For example, in a case in which a Ni pre-coated checkered steel sheet is used, not only Ni in the coating layer but also Ni in the Ni pre-coating is detected by ICP analysis. Specifically, for example, in a case in which a pre-coated checkered steel sheet having a Ni deposited amount of from 1 $g/m^2$ to 3 $g/m^2$ (thickness of about from 0.1 μm to 0.3 μm) is used as the substrate checkered steel sheet, even when the concentration of Ni contained in the coating layer is 0%, the Ni concentration is detected as from 0.1% to 15%. Therefore, the Ni concentration in the coating layer may be unknown as a result of ICP analysis. When the Ni pre-coated checkered steel sheet is used as a substrate steel sheet, the Ni concentration in the coating layer is measured by glow discharge optical emission spectrometry (quantitative GDS). Specifically, three or more kinds of standard samples having different Ni concentrations are used in a high frequency glow discharge surface area analyzer (Manufactured by HORIBA, Ltd., model number: GD-Profiler2) to create a calibration curve for the relationship between the Ni concentration and the emission intensity of Ni. As the standard sample, Zn alloy standard samples IMN ZH1, ZH2, and ZH4 manufactured by BAS Inc. are used. Measurement conditions of GDS are as follows.

H.V.: Fe is 785 V, Ni is 630 V, and Co is 720 V.

Anode diameter: $\varphi^4$ mm

Gas: Ar

Gas pressure: 600 Pa

Output: 35 W

Next, a light emission intensity of Ni at a position of ½ of a coating layer film thickness of a coated steel material to be measured is obtained using GDS under the above conditions. A Ni concentration at the position of ½ of the coating layer is determined from the obtained emission intensity of Ni and the prepared calibration curve. The position of the coating layer ½ is a position in a time during which an intensity of Fe is saturated, that is, a position in a time of ½ of a time during which Ni reaches the base iron in the GDS analysis under the above conditions. The determined Ni concentration at the ½ position of the coating layer is defined as the Ni concentration in the coating layer. At this time, a "concentration (%) of another element" in the above-described Formula (1) for determining the Zn concentration is a sum of a concentration (%) of elements other than Ni in the ICP analysis and the Ni concentration (%) in the GDS analysis. That is, when a Ni pre-coated steel material is used as the substrate steel material, the Zn concentration of the coating layer is determined by "Formula (a'): Zn concentration=100−(concentration (%) of elements other than Ni in ICP analysis+Ni concentration (%) in GDS analysis)". In a case in which a Ni pre-coated checkered steel sheet is used as the substrate checkered steel sheet, a trace amount of Ni in a Ni pre-coating layer is dissolved in a coating bath when the substrate checkered steel sheet is immersed in the coating bath. Thus, the Ni concentration in the coating bath is from 0.02 to 0.03% higher than the Ni concentration in the coating bath that is initially made-up. Accordingly, in a case in which a Ni pre-coated checkered steel sheet is used, a Ni concentration in the coating layer is increased by 0.03% at the maximum.

A method of determining whether or not the substrate checkered steel sheet is a pre-coated checkered steel sheet is as follows.

A sample whose measurement surface is a cross section of cutting edge taken along a sheet thickness direction of a checkered steel sheet is collected from the target checkered steel sheet.

A vicinity of an interface between the coating layer and the substrate checkered steel sheet in the checkered steel sheet on a measurement surface of a sample is linearly analyzed by an Electron Probe MicroAnalyser (FE-EPMA) to measure the Ni concentration. The measurement conditions are an acceleration voltage of 15 kV, a beam diameter of about 100 nm, an irradiation time per point of 1,000 ms, and a measurement pitch of 60 nm. A measurement distance may be any distance as long as it can be confirmed whether or not the Ni concentration is concentrated at an interface between the coating layer and the substrate checkered steel sheet in the checkered steel sheet.

When the Ni concentration is concentrated at the interface between the coating layer and the substrate checkered steel sheet in the checkered steel sheet, the substrate checkered steel sheet is discriminated as a pre-coated checkered steel sheet.

Next, the Al—Fe alloy layer will be described.

The Al—Fe alloy layer may be formed on the surface of the substrate checkered steel sheet (specifically, between the substrate checkered steel sheet and the Zn—Al—Mg alloy layer), and is a layer having a structure in which an $Al_5Fe$ phase is a main phase. The Al—Fe alloy layer is formed by mutual atomic diffusion between the substrate checkered steel sheet and the coating bath. Since a checkered steel sheet according to the present disclosure forms a coating layer by a hot-dip coating method, an Al—Fe alloy layer is easily formed in the coating layer containing the Al element. Since Al of a certain concentration or more is contained in the coating bath, the $Al_5Fe$ phase is formed most. However, the atomic diffusion takes time, and there may be a portion where the Fe concentration is high in the vicinity of the substrate checkered steel sheet. Thus, the Al—Fe alloy layer may partially contain a small amount of an AlFe phase, an $Al_3Fe$ phase, an $Al_5Fe_2$ phase, or the like. In addition, since the coating bath also contains Zn at a certain concentration, the Al—Fe alloy layer also contains a small amount of Zn.

With regard to the corrosion resistance, there is no significant difference in any of the $Al_5Fe$ phase, the $Al_3Fe$ phase, the AlFe phase, and the $Al_5Fe_2$ phase. "Corrosion resistance" referred to herein is corrosion resistance at a portion that is not affected by welding.

Here, in a case in which Si is contained in the coating layer, the Si is particularly easily incorporated into the Al—Fe alloy layer, and an Al—Fe—Si intermetallic compound phase may be formed. Examples of the intermetallic compound phase to be identified include AlFeSi phases, and α, β, q1, q2-AlFeSi phases and the like exist as isomers. Thus, these AlFeSi phases and the like may be detected in the Al—Fe alloy layer. Such an Al—Fe alloy layer including these AlFeSi phases and the like is also referred to as an Al—Fe—Si alloy layer.

Since the thickness of the Al—Fe—Si alloy layer is also small relative to the Zn—Al—Mg alloy layer, the influence on the corrosion resistance of the entire coating layer is small.

In a case in which any of various pre-coated checkered steel sheet is used as a substrate checkered steel sheet, a structure of the Al—Fe alloy layer may change depending on the deposited amount of the pre-coating. Specifically, there are a case in which a pure metal layer used for pre-coating remains around the Al—Fe alloy layer, a case in which an intermetallic compound phase (for example, an $Al_3Ni$ phase) in which a constituent component of the Zn—Al—Mg alloy layer and a pre-coating component are bonded forms an alloy layer, a case in which an Al—Fe alloy layer in which some Al atoms and Fe atoms are replaced is formed, a case in which an Al—Fe—Si alloy layer in which some Al atoms, Fe atoms, and Si atoms are replaced is formed, and the like.

That is, the Al—Fe alloy layer is a layer that encompasses the above-described various modes of alloy layers in addition to the alloy layer mainly composed of the $Al_5Fe$ phase.

In a case in which the coating layer is formed on a Ni pre-coated checkered steel sheet among various pre-coated checkered steel sheets, an Al—Ni—Fe alloy layer is formed as the Al—Fe alloy layer.

The thickness of the Al—Fe alloy layer is, for example, from 0 μm to 7 μm.

The thickness of the Al—Fe alloy layer is preferably from 0.05 μm to 5 μm from viewpoints of increasing the adhesion of the coating layer (specifically, Zn—Al—Mg alloy layer) and ensuring corrosion resistance and formability.

Usually, since the thickness of a Zn—Al—Mg alloy layer is larger than that of an Al—Fe alloy layer, a contribution of the Al—Fe alloy layer as a coated checkered steel sheet to corrosion resistance is smaller than that of a Zn—Al—Mg alloy layer. However, the Al—Fe alloy layer contains Al and Zn, which are corrosion-resistant elements, at certain concentrations or more as inferred from the result of the component analysis. Therefore, the Al—Fe alloy layer has a certain degree of corrosion resistance with respect to the substrate checkered steel sheet.

In addition, when a coating layer having a chemical composition specified in the disclosure is formed by a hot-dip coating method, an Al—Fe alloy layer of 100 nm or more is often formed between the substrate checkered steel sheet and the Zn—Al—Mg alloy layer.

From the viewpoint of corrosion resistance, the Al—Fe alloy layer is preferably as thick as possible. Thus, the thickness of the Al—Fe alloy layer is preferably 0.05 μm or more. However, since a thick Al—Fe alloy layer is a cause of significant deterioration of a coating formability, the thickness is preferably equal to or less than a certain thickness. From a viewpoint of formability, the thickness of the Al—Fe alloy layer is preferably 7 μm or less. When the thickness of the Al—Fe alloy layer is 7 μm or less, cracks and an amount of powdering generated from the coated Al—Fe alloy layer as a starting point are reduced, indicating that the formability is improved. The thickness of the Al—Fe alloy layer is more preferably 5 μm or less, and still more preferably 2 μm or less.

The thickness of the Al—Fe alloy layer is measured as follows.

The thickness is measured at five arbitrary positions of the identified Al—Fe alloy layer in an SEM backscattered electron image (magnification: 10000×, view field size: 50 µm width×200 µm length, provided that an Al—Fe alloy layer is visible in the view field) of a cross section of cutting edge of a coating layer (a cross section of cutting edge taken along the sheet thickness direction of the coating layer) prepared by embedding a sample in a resin and then grinding. Then, the arithmetic average of the five positions is defined as the thickness of the Al—Fe alloy layer.

(Characteristics of Coated Checkered Steel Sheet)

—Layer Thickness Ratio of Coating Layer at Flat Part—

In a coated checkered steel sheet of the present disclosure, when a portion where the coating layer is locally thin or a portion where the coating layer is locally thick are generated at a flat part, corrosion resistance is deteriorated. In addition, a formability also deteriorates.

Therefore, a layer thickness ratio of the coating layer at the flat part on the left and right sides of the convex part (layer thickness of left coating layer/layer thickness of right coating layer) is set to from 0.2 to 5.0.

The layer thickness ratio of the coating layer at the flat part (layer thickness of left coating layer/layer thickness of right coating layer) is preferably 0.25 or more and 4.00 or less, and more preferably 0.33 or more and 3.00 or less, from viewpoints of improving corrosion resistance and formability.

Here, from viewpoints of corrosion resistance and formability, the layer thickness of the coating layer at the flat part is preferably from 1.0 µm to 300.0 µm, and more preferably from 2.0 µm to 200.0 µm.

The layer thickness ratio of the coating layer at the flat part is measured as follows.

First, a sample is collected in which a cross section of cutting edge orthogonal to a longitudinal direction of the convex part and taken along a sheet thickness direction at a central part in the longitudinal direction of the convex part from the central part of the sheet surface of the coated checkered steel sheet to be measured (Specifically, in FIG. 3A, a cross section of cutting edge corresponding to an F-F cross section of cutting edge is shown) is an observation surface.

Next, the sample is embedded in resin, and the observation surface of the sample is observed with a scanning electron microscope (SEM) at 500 times or 2000 times magnification (see FIGS. 1A and 1*i*).

Next, the layer thicknesses of the coating layer on the left and right flat part are measured, and the ratio of the layer thickness of the left coating layer/the layer thickness of the right coating layer is determined.

Figure 1B:
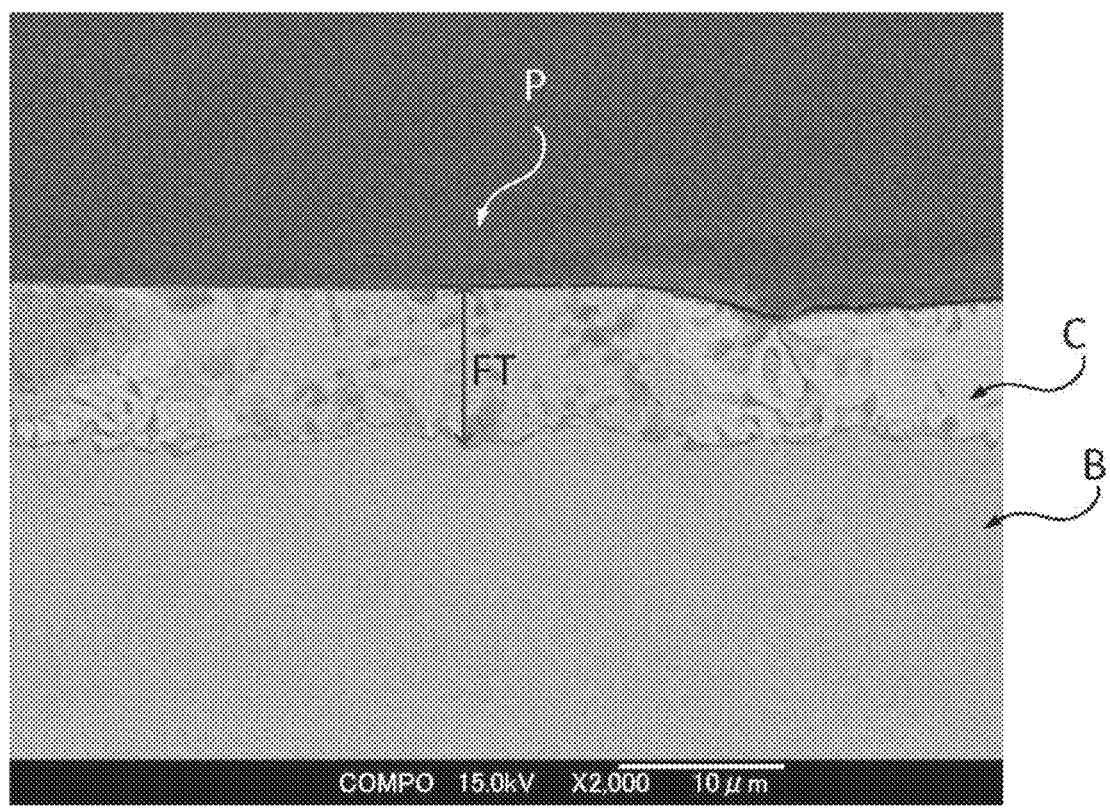
FIG. 1B is a SEM photograph (2000 times) showing an example of a cross section of cutting edge of the Zn—Al—Mg alloy coated checkered steel sheet according to the present disclosure.

Here, the layer thicknesses of the coating layer of the left and right flat part (see FT in FIG. 1B) are measured at a position 3 mm away from the boundary between the convex part and the flat part (specifically, an end (see EG in FIG. 1A) of the flat part where a pair of sheet surfaces facing each other in the sheet thickness direction are parallel to each other) (in FIG. 1, refer to FP).

In FIG. 1, B represents a substrate checkered steel sheet, C represents a coating layer, Q represents a convex part, and P represents a flat part.

Then, this operation is performed on three samples collected at a position 100 mm or more away from each other, and the calculated average value of the obtained "ratio of the layer thickness of the left coating layer/the layer thickness of the right coating layer" is taken as the "layer thickness ratio of the coating layer at the flat part".

—Formula 1 and Formula 2—

In the coated checkered steel sheet according to the present disclosure, when a convex height T−t indicated by the difference between the sheet thickness T of the substrate checkered steel sheet at the convex part and the sheet thickness t of the substrate checkered steel sheet at the flat part is too large, the difference in thermal expansion amount between the convex part and the flat part becomes too large. As a result, a deformation occurs due to heating and cooling before immersion in the coating bath, and a flatness deteriorates. Therefore, the convex height T−t is equal to or less than the sheet thickness of the substrate checkered steel sheet at the flat part.

On the other hand, the lower limit of the convex height T−t is set to greater than 0.5 mm in order to secure a function (for example, slip resistance) of the coated checkered steel sheet.

In the coated checkered steel sheet according to the present disclosure, when gap height x between the coated checkered steel sheet and a stationary surface in a case in which the coated checkered steel sheet is placed in a stationary position is too large, the flatness deteriorates. Therefore, the gap height x is set to be equal to or less than the convex height T−t×1.5.

When the flatness of the coated checkered steel sheet according to the present disclosure is deteriorated, the layer thickness ratio of the coating layer of the flat part on the left and right sides of the convex part increases, and corrosion resistance and formability are also deteriorated.

Therefore, the convex height T−t where the sheet thickness of the substrate checkered steel sheet at the convex part is T and the sheet thickness of the substrate checkered steel sheet at the flat part is t, and the gap height x between a stationary surface and a sheet surface of the coated checkered steel sheet opposing the stationary surface in a case in which the coated checkered steel sheet is placed in a stationary position, are set to satisfy the following Formulae 1 and 2.

$$x/(T-t) \leq 1.5 \qquad \text{Formula 1:}$$

$$0.5 < T-t \leq t \qquad \text{Formula 2:}$$

In Formula 1 and Formula 2, units of the sheet thicknesses T and t and the gap height x of the substrate checkered steel sheet are millimeters.

In the Formula 1, a value of "$x/(T-t)$" is preferably 1.2 or less, more preferably 1.0 or less from viewpoints of improving the flatness, improving the corrosion resistance, and improving the formability. From the same viewpoints, the value of "$x/(T-t)$" is preferably close to 0.

In the Formula 2, a value of "T−t" is preferably 0.8t or less, more preferably 0.7t or less from viewpoints of improving the flatness, improving the corrosion resistance, and improving the formability. The lower limit of the convex height T−t is set in consideration of improvement in function of the coated checkered steel sheet (for example, slip resistance).

Here, the sheet thickness t of the substrate checkered steel sheet at the flat part is preferably from 1.6 mm to 6.0 mm.

The gap height x is preferably 3.0 mm or less, and more preferably 2.0 mm or less from viewpoints of flatness, corrosion resistance, and formability.

In consideration of the function of the coated checkered steel sheet (for example, slip resistance), the area occupancy of the convex part (that is, the checkered part) is preferably from 15% to 60%.

The sheet thickness T of the substrate checkered steel sheet at the convex part, the sheet thickness t of the substrate checkered steel sheet at the flat part, the convex height T−t, and the gap height x are measured as follows.

First, a sample of 300 mm square is collected from the center of the sheet surface of the coated checkered steel sheet to be measured.

Next, the collected sample is placed on a horizontal surface (stationary surface). However, the sheet surface of the sample facing the stationary surface is a surface corresponding to a sheet surface of the coated checkered steel sheet on which the convex part and the flat part are not provided.

Figure 2:
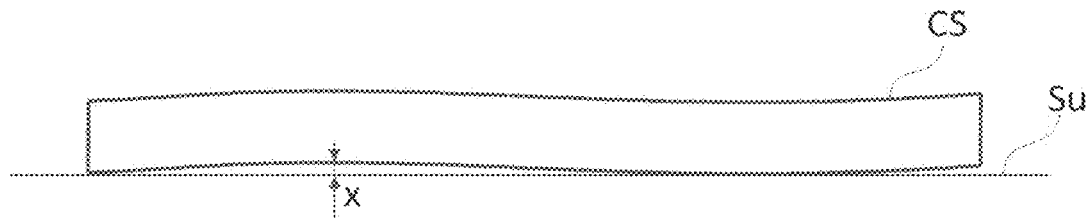
FIG. 2 is a schematic view for explaining a method for measuring a gap height x in the Zn—Al—Mg alloy coated checkered steel sheet according to the present disclosure.

The stationary sample is observed from the horizontal direction with respect to the stationary surface, and the gap height between the stationary surface and the sheet surface of the sample facing the stationary surface is measured (see FIG. 2).

This operation is performed from the four sides directions of the sample, and the maximum value of the gap heights is set as the gap height x.

In FIG. 2, CS represents a sample of a coated checkered steel sheet, and Su represents a stationary surface.

On the other hand, a sample is collected in which a cross section of cutting edge orthogonal to a longitudinal direction of the convex part and taken along a sheet thickness direction at a central part in the longitudinal direction of the convex part from a sample of 300 mm square (Specifically, in FIG. 3A, a cross section of cutting edge corresponding to an F-F cross section of cutting edge is shown) is an observation surface.

Next, the sample is embedded in resin, and the observation surface of the sample is observed with an optical microscope at a magnification of 25× (see FIG. 1).

Next, the sheet thickness of the substrate checkered steel sheet at the central part in the width direction of the convex part and the sheet thickness of the substrate checkered steel sheet at the central part in the width direction of the flat part are measured.

Then, this operation is performed on three samples, and the maximum value of the obtained "sheet thicknesses of the substrate checkered steel sheet at the central part in the width direction of the convex part" and the maximum value of "sheet thicknesses of the substrate checkered steel sheet at the central part in the width direction of the flat part" are defined as the sheet thickness T of the substrate checkered steel sheet at the convex part and the sheet thickness t of the substrate checkered steel sheet at the flat part, respectively, and the difference is defined as the convex height T–t.

(Method for Manufacturing Coated Checkered Steel Sheet)

Next, an example of a method for manufacturing coated checkered steel sheet according to the present disclosure will be described.

In the method for manufacturing a coated checkered steel sheet according to the present disclosure, for example, a substrate checkered steel sheet is heated and held at a heating rate of from 5° C./s to 20° C./s to a temperature of a coating bath+20° C. or higher and 850° C. or lower, then cooled at a cooling rate of from 5° C./s to 20° C./s to a range of the temperature of the coating bath or higher to the temperature of the coating bath+10° C. or lower, the cooled substrate checkered steel sheet is immersed in the coating bath, pulled up from the coating bath, and then cooled at a cooling rate of from 5° C./s to 20° C./s to 500° C. when the temperature of the coating bath is greater than 500° C., thereby manufacturing a coated checkered steel sheet.

Here, for coating, for example, a continuous hot-dip metal coating method such as a zendymia method is performed.

An example of a specific manufacturing method is as follows.

First, a substrate checkered steel sheet in which the convex height T–t satisfies Formula 1 is prepared.

Next, after pickling the substrate checkered steel sheet, the substrate checkered steel sheet is heated and held at a heating ultimate temperature.

Here, the substrate checkered steel sheet may be subjected to pre-coating (for example, Ni pre-coating) after pickling and before heating.

The heating ultimate temperature is the temperature of the coating bath+20° C. or more and 850° C. or less. By setting the heating ultimate temperature to 850° C. or lower, deformation of the substrate checkered steel sheet is suppressed, and flatness is improved.

The heating rate is from 5° C./s to 20° C./s. By slowly heating the substrate checkered steel sheet at a heating rate of 20° C./s or less, the temperature of the convex part and the flat part of the substrate checkered steel sheet uniformly rises, and deformation due to a difference in thermal expansion between the convex part and the flat part is suppressed. As a result, further deterioration of flatness is suppressed.

When the heating rate is excessively decreased, it is difficult for the convex part and the flat part of the substrate checkered steel sheet to uniformly rise in temperature, and deformation due to a difference in thermal expansion between the convex part and the flat part easily occurs. Therefore, the heating rate is set to 5° C./s.

When pre-coating is not performed, the heating retention time is from 10 seconds to 120 seconds. By setting the heating retention time from 10 seconds to 120 seconds, the oxide film on the surface can be reduced to improve the coating property.

The substrate checkered steel sheet is heated by, for example, energization heating, non-oxidation direct flame heating, and radiation heating.

Next, the substrate checkered steel sheet is cooled to a range of a temperature equal to or higher than the temperature of the coating bath to equal to or lower than the temperature of the coating bath+10.

The cooling rate is from 5° C./s to 20° C./s. By slowly cooling the substrate checkered steel sheet at a cooling rate of 20° C./s or less, the temperature of the convex part and the flat part of the substrate checkered steel sheet uniformly falls, and deformation due to a difference in thermal shrinkage between the convex part and the flat part is suppressed. As a result, further deterioration of flatness is suppressed.

When a cooling rate is excessively decreased, it is difficult for the convex part and the flat part of the substrate checkered steel sheet to uniformly fall in temperature, and deformation due to a difference in thermal shrinkage between the convex part and the flat part easily occurs. Therefore, the cooling rate is set to 5° C./s.

Cooling of the substrate checkered steel sheet is performed by, for example, nitrogen gas cooling.

As described above, by heating and cooling the substrate checkered steel sheet before coating, deterioration of flatness is suppressed, as a result, a coated checkered steel sheet in which the gap height x satisfies Formula 2 is obtained.

Next, the cooled substrate checkered steel sheet is immersed in a coating bath having a chemical composition equivalent to the chemical composition of the coating layer in the coated checkered steel sheet according to the present disclosure.

Next, after the substrate checkered steel sheet is pulled up from the coating bath, the coating deposited amount is adjusted by wiping, and the substrate checkered steel sheet is cooled.

When the temperature of the coating bath is 500° C. or lower, the cooling conditions after coating are not particularly limited. When the temperature of the coating bath is higher than 500° C., the cooling rate to 500° C. after coating is from 5° C./s to 20° C./s. By slowly cooling the substrate checkered steel sheet at a cooling rate of 20° C./s or less, the temperature of the convex part and the flat part of the substrate checkered steel sheet uniformly falls, and deformation due to a difference in thermal expansion between the convex part and the flat part is suppressed. As a result, further deterioration of flatness is suppressed.

When the cooling rate is excessively decreased, it is difficult for the convex part and the flat part of the substrate checkered steel sheet to uniformly fall in temperature, and deformation due to a difference in thermal expansion between the convex part and the flat part easily occurs. Therefore, the cooling rate is set to 5° C./s.

The cooling condition of 500° C. or lower is not particularly limited.

Cooling after coating is performed by, for example, air cooling or nitrogen gas cooling.

Here, in a case in which the flatness of the substrate checkered steel sheet is poor, the distance between the wiping nozzle and the substrate checkered steel sheet changes depending on the location at the time of wiping after coating, as a result, a portion where the coating layer is locally thin and a portion where the coating layer is thick are generated, and the layer thickness of the coating layer varies among the flat part.

In addition, also in the case of gas cooling, since the distance between the cooling nozzle and the substrate checkered steel sheet varies depending on the location, a portion where the coating layer is locally thin and a portion where the coating layer is thick are generated, and the layer thickness of the coating layer varies among flat part.

In particular, since the Zn—Al—Mg alloy coating bath has a lower viscosity than the Zn-based coating bath, the layer thickness of the coating layer tends to vary.

However, as described above, since the substrate checkered steel sheet is suppressed from further deteriorating in flatness at the time of heating and cooling before immersion in the coating bath, even when Zn—Al—Mg alloy coating is performed, the layer thickness of the coating layer hardly varies among the flat part, and a Zn—Al—Mg alloy coated checkered steel sheet in which the layer thickness ratio of the coating layer of the flat part on the left and right sides of the convex part (layer thickness of left coating layer/layer thickness of right coating layer) satisfies the above range is obtained.

Hereinafter, post-treatments applicable to a coated checkered steel sheet according to the disclosure will be described.

A film may be formed on the coating layer of a coated checkered steel sheet according to the disclosure. The film may be constituted with a single layer or two or more layers. Examples of the kind of the film that is directly on the coating layer include a chromate film, a phosphate film, and a chromate-free film. A chromate treatment, a phosphate treatment, and a chromate-free treatment for forming these films can be performed by known methods.

As the chromate treatment, there are an electrolytic chromate treatment in which a chromate film is formed by electrolysis, a reactive chromate treatment in which a film is formed by utilizing a reaction with a material, and thereafter, the excess treatment liquid is washed off, and an application type chromate treatment in which a film is formed by applying a treatment liquid to an object and drying without washing with water. Any of these treatments may be employed.

Examples of the electrolytic chromate treatment include electrolytic chromate treatments using chromic acid, a silica sol, a resin (such as an acrylic resin, a vinyl ester resin, a vinyl acetate/acrylic emulsion, a carboxylated styrene butadiene latex, or a diisopropanolamine-modified epoxy resin), and hard silica.

Examples of the phosphate treatment include a zinc phosphate treatment, a zinc calcium phosphate treatment, and a manganese phosphate treatment.

Chromate-free treatments are particularly suitable because they do not impose a burden on the environment. As the chromate-free treatment, there are an electrolytic type chromate-free treatment in which a chromate-free film is formed by electrolysis, a reactive chromate-free treatment in which a film is formed by utilizing a reaction with a material, and thereafter, the excess treatment liquid is washed off, and an application type chromate-free treatment in which a film is formed by applying a treatment liquid to an object and drying without washing with water. Any of these treatments may be employed.

Moreover, one layer or two or more layers of organic resin film may be provided on the film that is directly on the coating layer. The kind of the organic resin is not particularly limited, and examples thereof include polyester resins, polyurethane resins, epoxy resins, acrylic resins, polyolefin resins, and modified products of these resins. Here, the modified product refers to a resin obtained by reacting a reactive functional group contained in the structure of these resins with another compound (a monomer, a crosslinking agent, or the like) that has, in the structure thereof, a functional group capable of reacting with the aforementioned functional group.

As such an organic resin, one kind or a mixture of two or more kinds of (unmodified) organic resins may be used, or one kind or a mixture of two or more kinds of organic resins obtained by modifying at least one kind of organic resin in the presence of at least one other kind of organic resin may be used. The organic resin film may contain an optional coloring pigment or rust preventive pigment. A water-based form prepared by dissolution or dispersion in water can also be used.

Example

Examples of the disclosure will be described. However, the conditions in the Examples are one example of conditions that are employed in order to confirm the feasibility and effects of the disclosure, and the disclosure is not limited to this one example of conditions. The disclosure can employ various conditions insofar as the object of the disclosure is achieved without departing from the gist of the disclosure.

Examples

In order to obtain a coating layer having a chemical composition shown in Table 1 and Table 2, a predetermined amount of a pure metal ingot was used and melted, then a coating bath was prepared in air. A batch-wise hot-dip coating apparatus was used for producing coated checkered steel sheet.

Then, coated checkered steel sheets were prepared under the conditions shown in Tables 1 and 2. Specifically, it is as follows.

The substrate checkered steel sheet was heated from room temperature by electric heating in an $N_2$—$H_2$ (5%) environment (dew point of −40° C. or lower, oxygen concentration of less than 25 ppm), held for 60 seconds, then cooled to a coating bath temperature+10° C. by $N_2$ gas blow, and immediately immersed in the coating bath. Thereafter, the substrate checkered steel sheet was pulled up from the coating bath, and the $N_2$ gas wiping pressure was adjusted so that the coating deposited amount on the sheet surface provided with the convex part and the flat part was about 250 g/m², thereby preparing a coated checkered steel sheet.

As the substrate checkered steel sheet, various hot-rolled checkered steel sheets having different sheet thicknesses T of convex part and different sheet thicknesses t of flat part were used.

Figure 3A:
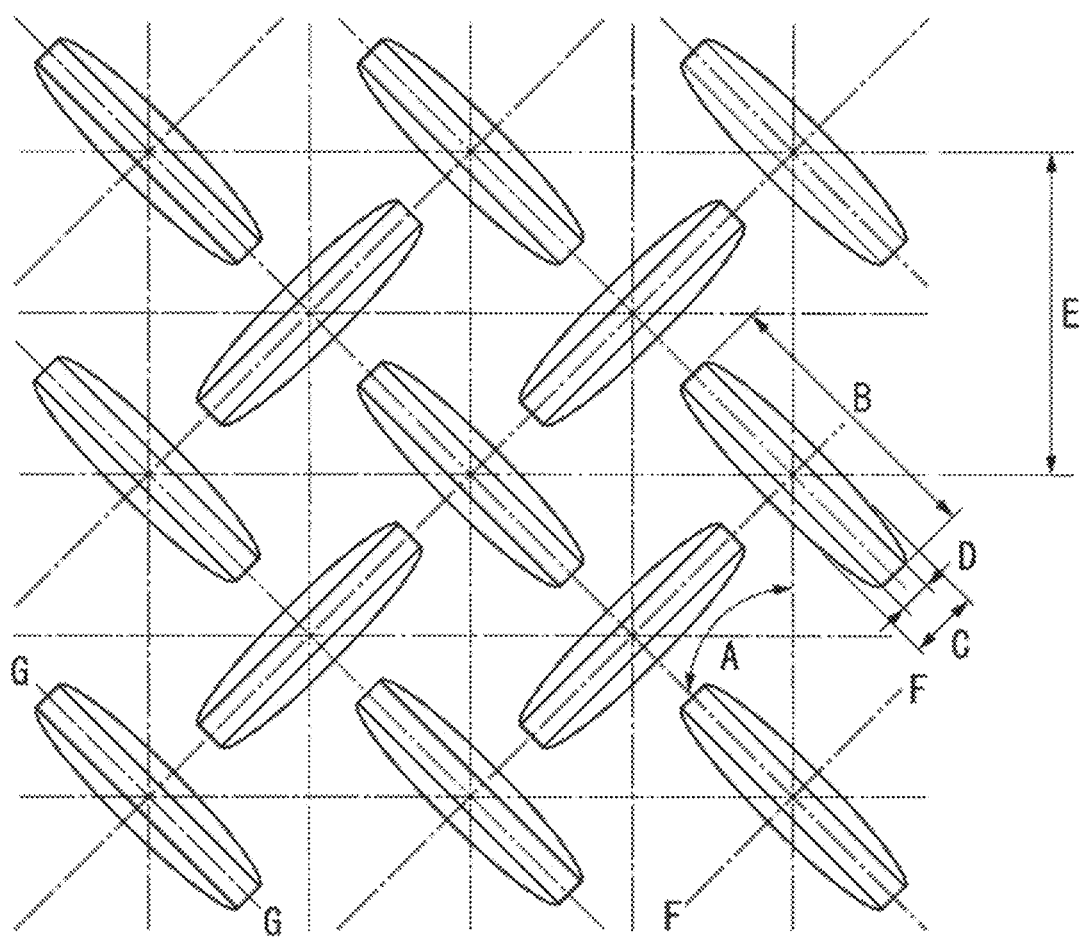
FIG. 3A is a schematic plan view showing an example of a substrate checkered steel sheet of the Zn—Al—Mg alloy coated checkered steel sheet according to the present disclosure.
Figure 3B:
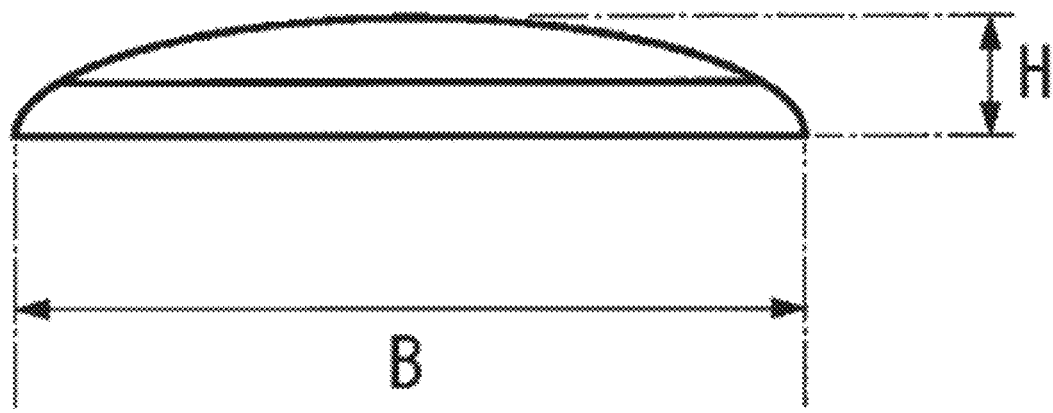
FIG. 3B is a schematic cross-sectional view showing an example of a substrate checkered steel sheet of the Zn—Al—Mg alloy coated checkered steel sheet according to the present disclosure, and is a schematic cross-sectional view taken along line G-G in FIG. 3A.
Figure 3C:
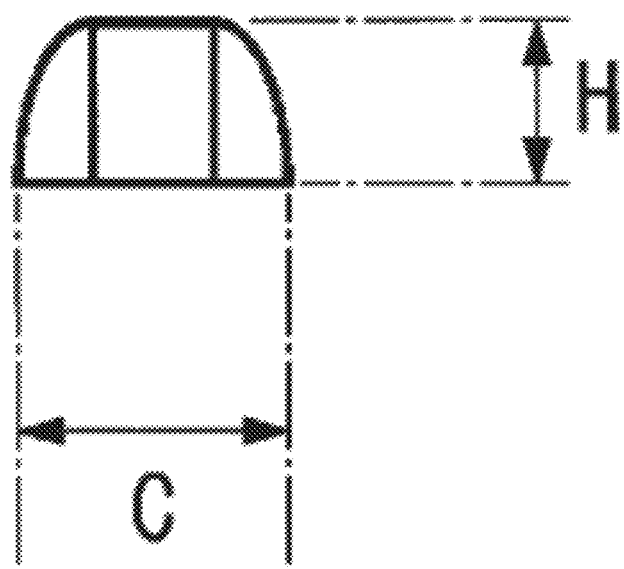
FIG. 3C is a schematic cross-sectional view showing an example of a substrate checkered steel sheet of the Zn—Al—Mg alloy coated checkered steel sheet according to the present disclosure, and is a schematic cross-sectional view taken along line F-F in FIG. 3A.

The shape of the substrate checkered steel sheet used was the same as that in FIGS. 3A to 3C. In the drawings, A, B, C, D, E, and H are as follows, respectively.

A: Arrangement angle of the convex part with respect to a rolling direction
B: Length of one convex part
C: Maximum width of one convex part
D: Minimum width of one convex part
E: Arrangement pitch of convex part
H: Convex height (that is, checkered steel sheet height)

This checkered steel sheet was hot-rolled Al-killed steel and had an angle A=45°, a length B=25.3 mm, a maximum width C=5.1 mm, a minimum width D=2.5 mm, and a pitch E=28.6 mm. The area occupancy of the convex part was 40%.

However, the height H of the convex part (that is, the convex height T−t) was as shown in Table 1.

In some examples, a Ni pre-coated checkered steel sheet obtained by Ni pre-coating the hot-rolled checkered steel sheet was used as the substrate checkered steel sheet. A deposited amount of Ni was from 1 g/m² to 3 g/m². In the example in which the Ni pre-coated checkered steel sheet was used as the substrate checkered steel sheet, "Ni pre-" was written in the column of "Substrate checkered steel sheet" in the table.

—Various Measurements—

For the resulting coated checkered steel sheet, the following items were measured according to the method described above.

Layer thickness ratio of coating layer of flat part on left and right sides of convex part (layer thickness of left coating layer/layer thickness of right coating layer)
Sheet thickness T of substrate checkered steel sheet at convex part (in the table, it is described as "convex part sheet thickness T".)
Sheet thickness t of substrate checkered steel sheet at flat part (in the table, it is described as "flat part sheet thickness T".)
Gap height x —Flatness—

In order to compare a flatness, a sample was placed on a flat table, and the sample was pressed from above to evaluate a degree of rattling. A case without rattling was evaluated as "A+", a case with slight rattling was evaluated as "A", and a case with large rattling was evaluated as "NG".

—Corrosion Resistance—

In order to compare a corrosion resistance, a manufactured sample was subjected to a Corrosion Acceleration Test (JASO M609-91) for 30 cycles, and an average value of red rust generation area ratios was evaluated. The red rust generation area ratio of 3.0% or less was evaluated as "A+", the red rust generation area ratio of 5.0% or less was evaluated as "A", the red rust generation area ratio of 7.0% or less was evaluated as "B", and the red rust generation area ratio of greater than 7.0% was evaluated as "NG".

—Formability—

In order to evaluate a formability of a coating layer, the coated checkered steel sheet was bent at 90° V with the sheet surface provided with convex part and flat part facing crest sides, and a cellophane tape having a width of 24 mm was pressed against a V-bent crest portion and pulled away. When an area ratio of the coating layer that was separated from the coated checkered steel sheet and adhered to the cellophane tape to an area of the pressed cellophane tape was 3.0% or less, 5.0% or less, 10.000 or less, and greater than 10.000, the area ratio was evaluated as "A+", "A", "B", and "NG", respectively.

The Examples are listed in Table 1 and Table 2.

TABLE 1-1

| No. | Classification | substrate checkered steel sheet | Melting point of coating bath (° C.) | Temperature of coating bath (° C.) | Heating ultimate temperature (° C.) | Heating rate (° C./s) | Cooling rate (° C./s) | Immersion time (second) | Cooling after coating Cooling rate to 500° C. (° C./s) |
|---|---|---|---|---|---|---|---|---|---|
| 1 | Example | — | 360 | 380 | 820 | 10 | 10 | 2 | — |
| 2 | Example | — | 360 | 380 | 820 | 10 | 10 | 2 | — |
| 3 | Example | — | 380 | 400 | 820 | 10 | 10 | 2 | — |
| 4 | Example | — | 380 | 400 | 820 | 10 | 10 | 2 | — |
| 5 | Example | — | 470 | 490 | 820 | 10 | 10 | 2 | — |
| 6 | Example | — | 460 | 480 | 820 | 10 | 10 | 2 | — |
| 7 | Example | — | 465 | 485 | 820 | 10 | 10 | 2 | — |
| 8 | Example | — | 460 | 480 | 820 | 10 | 10 | 2 | — |
| 9 | Example | — | 460 | 480 | 820 | 10 | 10 | 2 | — |
| 10 | Example | — | 460 | 480 | 820 | 10 | 10 | 2 | — |
| 11 | Example | — | 460 | 480 | 820 | 10 | 10 | 2 | — |
| 12 | Example | — | 460 | 480 | 820 | 10 | 10 | 2 | — |
| 13 | Example | — | 460 | 480 | 820 | 10 | 10 | 2 | — |
| 14 | Example | — | 470 | 490 | 820 | 10 | 10 | 2 | — |
| 15 | Example | — | 460 | 480 | 820 | 10 | 10 | 2 | — |
| 16 | Example | — | 460 | 480 | 820 | 10 | 10 | 2 | — |
| 17 | Example | — | 450 | 470 | 820 | 10 | 10 | 2 | — |
| 18 | Example | — | 440 | 460 | 820 | 10 | 10 | 2 | — |
| 19 | Example | — | 390 | 410 | 820 | 10 | 10 | 2 | — |
| 20 | Example | — | 365 | 385 | 820 | 10 | 10 | 2 | — |

TABLE 1-1-continued

| | | Melting substrate checkered steel sheet | point of coating bath (° C.) | Temperature of coating bath (° C.) | Heating & cooling before coating | | | | Cooling after coating Cooling rate to 500° C. (° C./s) |
|---|---|---|---|---|---|---|---|---|---|
| No. | Classification | — | | | Heating ultimate temperature (° C.) | Heating rate (° C./s) | Cooling rate (° C./s) | Immersion time (second) | |
| 21 | Example | — | 460 | 480 | 820 | 10 | 10 | 2 | — |
| 22 | Example | — | 460 | 480 | 820 | 10 | 10 | 2 | — |
| 23 | Example | — | 460 | 480 | 820 | 10 | 10 | 2 | — |
| 24 | Example | — | 460 | 480 | 820 | 10 | 10 | 2 | — |
| 25 | Example | — | 460 | 480 | 820 | 10 | 10 | 2 | — |
| 26 | Example | — | 460 | 480 | 820 | 10 | 10 | 2 | — |
| 27 | Example | — | 460 | 480 | 820 | 10 | 10 | 2 | — |
| 28 | Example | — | 460 | 480 | 820 | 10 | 10 | 2 | — |
| 29 | Example | — | 460 | 480 | 820 | 10 | 10 | 2 | — |
| 30 | Example | — | 470 | 490 | 820 | 10 | 10 | 2 | — |
| 31 | Example | — | 460 | 480 | 820 | 10 | 10 | 2 | — |
| 32 | Example | — | 460 | 480 | 820 | 10 | 10 | 2 | — |
| 33 | Example | — | 460 | 480 | 820 | 10 | 10 | 2 | — |
| 34 | Example | — | 460 | 480 | 820 | 10 | 10 | 2 | — |
| 35 | Example | — | 460 | 480 | 820 | 10 | 10 | 2 | — |
| 36 | Example | — | 460 | 480 | 820 | 10 | 10 | 2 | — |
| 37 | Example | — | 460 | 480 | 820 | 10 | 10 | 2 | — |
| 38 | Example | — | 460 | 480 | 820 | 10 | 10 | 2 | — |
| 39 | Example | — | 460 | 480 | 820 | 10 | 10 | 2 | — |
| 40 | Example | — | 460 | 480 | 820 | 10 | 10 | 2 | — |
| 41 | Example | — | 460 | 480 | 820 | 10 | 10 | 2 | — |
| 42 | Example | — | 460 | 480 | 820 | 10 | 10 | 2 | — |
| 43 | Example | — | 460 | 480 | 820 | 10 | 10 | 2 | — |
| 44 | Example | — | 460 | 480 | 820 | 10 | 10 | 2 | — |
| 45 | Example | — | 460 | 480 | 820 | 10 | 10 | 2 | — |
| 46 | Example | — | 460 | 480 | 820 | 10 | 10 | 2 | — |
| 47 | Example | — | 460 | 550 | 820 | 10 | 10 | 2 | 5 |
| 48 | Example | — | 460 | 550 | 820 | 10 | 10 | 2 | 18 |
| 49 | Example | — | 460 | 480 | 820 | 10 | 10 | 2 | — |
| 50 | Example | — | 460 | 480 | 820 | 10 | 10 | 2 | — |
| 51 | Example | — | 460 | 480 | 820 | 10 | 10 | 2 | — |
| 52 | Example | — | 460 | 480 | 820 | 10 | 10 | 2 | — |
| 53 | Example | — | 460 | 480 | 820 | 20 | 10 | 2 | — |
| 53 | Example | — | 460 | 480 | 820 | 20 | 10 | 2 | — |
| 54 | Example | — | 460 | 480 | 820 | 10 | 20 | 2 | — |
| 55 | Example | — | 460 | 480 | 820 | 20 | 20 | 2 | — |
| 56 | Example | — | 460 | 480 | 820 | 10 | 10 | 2 | — |
| 57 | Example | — | 460 | 480 | 820 | 10 | 10 | 2 | — |
| 58 | Example | — | 460 | 480 | 820 | 10 | 10 | 2 | — |
| 59 | Example | Ni Pre- | 460 | 480 | 500 | 15 | 5 | 2 | — |
| 60 | Example | Ni Pre- | 460 | 480 | 500 | 15 | 5 | 2 | — |
| 61 | Example | Ni Pre- | 460 | 480 | 500 | 15 | 5 | 2 | — |
| 62 | Example | Ni Pre- | 460 | 480 | 500 | 15 | 5 | 2 | — |

TABLE 1-2

| | | Composition of coating layer (% by mass) | | | | | | | | | | | | | | | | |
|---|---|---|---|---|---|---|---|---|---|---|---|---|---|---|---|---|---|---|
| No. | Classification | Zn | Al | Mg | Sn | Bi | In | Ca | Y | La | Ce | Si | Cr | Ti | Zr | Mo | W | Ag | P |
| 1 | Example | 97.6 | 1.2 | 1.1 | 0.00 | 0 | 0 | 0 | 0 | 0 | 0 | 0 | 0 | 0 | 0 | 0 | 0 | 0 | 0 |
| 2 | Example | 94.9 | 2.5 | 2.5 | 0.00 | 0 | 0 | 0 | 0 | 0 | 0 | 0 | 0 | 0 | 0 | 0 | 0 | 0 | 0 |
| 3 | Example | 88.4 | 5.5 | 6 | 0.00 | 0 | 0 | 0 | 0 | 0 | 0 | 0 | 0 | 0 | 0 | 0 | 0 | 0 | 0 |
| 4 | Example | 88.32 | 5.5 | 6 | 0.08 | 0 | 0 | 0 | 0 | 0 | 0 | 0 | 0 | 0 | 0 | 0 | 0 | 0 | 0 |
| 5 | Example | 59.32 | 24.5 | 6 | 0.08 | 0 | 0 | 0 | 0 | 0 | 0 | 0 | 0 | 0 | 0 | 0 | 0 | 0 | 0 |
| 6 | Example | 78.32 | 18 | 3.5 | 0.08 | 0 | 0 | 0 | 0 | 0 | 0 | 0 | 0 | 0 | 0 | 0 | 0 | 0 | 0 |
| 7 | Example | 69.82 | 18 | 12 | 0.08 | 0 | 0 | 0 | 0 | 0 | 0 | 0 | 0 | 0 | 0 | 0 | 0 | 0 | 0 |
| 8 | Example | 75.8 | 18 | 6 | 0.10 | 0 | 0 | 0 | 0 | 0 | 0 | 0 | 0 | 0 | 0 | 0 | 0 | 0 | 0 |
| 9 | Example | 75.5 | 18 | 6 | 0.10 | 0 | 0 | 0.2 | 0 | 0 | 0 | 0.1 | 0 | 0 | 0 | 0 | 0 | 0 | 0 |
| 10 | Example | 75.7 | 18 | 6 | 0.20 | 0 | 0 | 0 | 0 | 0 | 0 | 0 | 0 | 0 | 0 | 0 | 0 | 0 | 0 |
| 11 | Example | 75.5 | 18 | 6 | 0.20 | 0 | 0 | 0.1 | 0 | 0 | 0 | 0.1 | 0 | 0 | 0 | 0 | 0 | 0 | 0 |
| 12 | Example | 75.5 | 18 | 6 | 0.20 | 0 | 0 | 0 | 0 | 0 | 0 | 0.2 | 0 | 0 | 0 | 0 | 0 | 0 | 0 |
| 13 | Example | 75.4 | 18 | 6 | 0.00 | 0 | 0 | 0 | 0 | 0 | 0 | 0.5 | 0 | 0 | 0 | 0 | 0 | 0 | 0 |
| 14 | Example | 74.87 | 18 | 6 | 0.03 | 0 | 0 | 0 | 0 | 0 | 0 | 1 | 0 | 0 | 0 | 0 | 0 | 0 | 0 |
| 15 | Example | 74.04 | 18 | 6 | 0.06 | 0 | 0 | 0.3 | 0 | 0 | 0 | 1.5 | 0 | 0 | 0 | 0 | 0 | 0 | 0 |
| 16 | Example | 75.81 | 18 | 6 | 0.09 | 0 | 0 | 0 | 0 | 0 | 0 | 0 | 0 | 0 | 0 | 0 | 0 | 0 | 0 |
| 17 | Example | 75.79 | 18 | 6 | 0.13 | 0 | 0 | 0 | 0 | 0 | 0 | 0 | 0 | 0 | 0 | 0 | 0 | 0 | 0 |
| 18 | Example | 75.75 | 18 | 6 | 0.15 | 0 | 0 | 0 | 0 | 0 | 0 | 0 | 0 | 0 | 0 | 0 | 0 | 0 | 0 |
| 19 | Example | 75.73 | 18 | 6 | 0.17 | 0 | 0 | 0 | 0 | 0 | 0 | 0 | 0 | 0 | 0 | 0 | 0 | 0 | 0 |
| 20 | Example | 85.74 | 10 | 4 | 0.19 | 0 | 0 | 0 | 0 | 0 | 0 | 0 | 0 | 0 | 0 | 0 | 0 | 0 | 0 |

TABLE 1-2-continued

| | | Composition of coating layer (% by mass) | | | | | | | | | | | | | | | | |
|---|---|---|---|---|---|---|---|---|---|---|---|---|---|---|---|---|---|---|
| No. | Classification | Zn | Al | Mg | Sn | Bi | In | Ca | Y | La | Ce | Si | Cr | Ti | Zr | Mo | W | Ag | P |
| 21 | Example | 71.32 | 18 | 6 | 0.08 | 4.5 | 0 | 0 | 0 | 0 | 0 | 0 | 0 | 0 | 0 | 0 | 0 | 0 | 0 |
| 22 | Example | 74.32 | 18 | 6 | 0.08 | 0 | 1.5 | 0 | 0 | 0 | 0 | 0 | 0 | 0 | 0 | 0 | 0 | 0 | 0 |
| 23 | Example | 75.72 | 18 | 6 | 0.08 | 0 | 0 | 0.1 | 0 | 0 | 0 | 0 | 0 | 0 | 0 | 0 | 0 | 0 | 0 |
| 24 | Example | 75.32 | 18 | 6 | 0.08 | 0 | 0 | 0.5 | 0 | 0 | 0 | 0 | 0 | 0 | 0 | 0 | 0 | 0 | 0 |
| 25 | Example | 74.82 | 18 | 6 | 0.08 | 0 | 0 | 1 | 0 | 0 | 0 | 0 | 0 | 0 | 0 | 0 | 0 | 0 | 0 |
| 26 | Example | 72.82 | 18 | 6 | 0.08 | 0 | 0 | 3 | 0 | 0 | 0 | 0 | 0 | 0 | 0 | 0 | 0 | 0 | 0 |
| 27 | Example | 75.32 | 18 | 6 | 0.08 | 0 | 0 | 0 | 0.5 | 0 | 0 | 0 | 0 | 0 | 0 | 0 | 0 | 0 | 0 |
| 28 | Example | 75.42 | 18 | 6 | 0.08 | 0 | 0 | 0 | 0 | 0.4 | 0 | 0 | 0 | 0 | 0 | 0 | 0 | 0 | 0 |
| 29 | Example | 75.42 | 18 | 6 | 0.08 | 0 | 0 | 0 | 0 | 0 | 0.4 | 0 | 0 | 0 | 0 | 0 | 0 | 0 | 0 |
| 30 | Example | 73.52 | 18 | 6 | 0.08 | 0 | 0 | 0 | 0 | 0 | 0 | 2.3 | 0 | 0 | 0 | 0 | 0 | 0 | 0 |
| 31 | Example | 75.62 | 18 | 6 | 0.08 | 0 | 0 | 0 | 0 | 0 | 0 | 0 | 0.2 | 0 | 0 | 0 | 0 | 0 | 0 |
| 32 | Example | 75.62 | 18 | 6 | 0.08 | 0 | 0 | 0 | 0 | 0 | 0 | 0 | 0 | 0.2 | 0 | 0 | 0 | 0 | 0 |
| 33 | Example | 75.62 | 18 | 6 | 0.08 | 0 | 0 | 0 | 0 | 0 | 0 | 0 | 0 | 0 | 0.2 | 0 | 0 | 0 | 0 |
| 34 | Example | 75.62 | 18 | 6 | 0.08 | 0 | 0 | 0 | 0 | 0 | 0 | 0 | 0 | 0 | 0 | 0.2 | 0 | 0 | 0 |
| 35 | Example | 75.62 | 18 | 6 | 0.08 | 0 | 0 | 0 | 0 | 0 | 0 | 0 | 0 | 0 | 0 | 0 | 0.2 | 0 | 0 |
| 36 | Example | 75.62 | 18 | 6 | 0.08 | 0 | 0 | 0 | 0 | 0 | 0 | 0 | 0 | 0 | 0 | 0 | 0 | 0.2 | 0 |
| 37 | Example | 75.62 | 18 | 6 | 0.08 | 0 | 0 | 0 | 0 | 0 | 0 | 0 | 0 | 0 | 0 | 0 | 0 | 0 | 0.2 |
| 38 | Example | 75.62 | 18 | 6 | 0.08 | 0 | 0 | 0 | 0 | 0 | 0 | 0 | 0 | 0 | 0 | 0 | 0 | 0 | 0 |
| 39 | Example | 75.62 | 18 | 6 | 0.08 | 0 | 0 | 0 | 0 | 0 | 0 | 0 | 0 | 0 | 0 | 0 | 0 | 0 | 0 |
| 40 | Example | 75.62 | 18 | 6 | 0.08 | 0 | 0 | 0 | 0 | 0 | 0 | 0 | 0 | 0 | 0 | 0 | 0 | 0 | 0 |
| 41 | Example | 75.62 | 18 | 6 | 0.08 | 0 | 0 | 0 | 0 | 0 | 0 | 0 | 0 | 0 | 0 | 0 | 0 | 0 | 0 |
| 42 | Example | 75.62 | 18 | 6 | 0.08 | 0 | 0 | 0 | 0 | 0 | 0 | 0 | 0 | 0 | 0 | 0 | 0 | 0 | 0 |
| 43 | Example | 75.62 | 18 | 6 | 0.08 | 0 | 0 | 0 | 0 | 0 | 0 | 0 | 0 | 0 | 0 | 0 | 0 | 0 | 0 |
| 44 | Example | 75.62 | 18 | 6 | 0.08 | 0 | 0 | 0 | 0 | 0 | 0 | 0 | 0 | 0 | 0 | 0 | 0 | 0 | 0 |
| 45 | Example | 75.62 | 18 | 6 | 0.08 | 0 | 0 | 0 | 0 | 0 | 0 | 0 | 0 | 0 | 0 | 0 | 0 | 0 | 0 |
| 46 | Example | 75.62 | 18 | 6 | 0.08 | 0 | 0 | 0 | 0 | 0 | 0 | 0 | 0 | 0 | 0 | 0 | 0 | 0 | 0 |
| 47 | Example | 70.92 | 18 | 6 | 0.08 | 0 | 0 | 0 | 0 | 0 | 0 | 0 | 0 | 0 | 0 | 0 | 0 | 0 | 0 |
| 48 | Example | 70.92 | 18 | 6 | 0.08 | 0 | 0 | 0 | 0 | 0 | 0 | 0 | 0 | 0 | 0 | 0 | 0 | 0 | 0 |
| 49 | Example | 75.42 | 18 | 6 | 0.08 | 0 | 0 | 0 | 0 | 0 | 0 | 0 | 0 | 0 | 0 | 0 | 0 | 0 | 0 |
| 50 | Example | 75.42 | 18 | 6 | 0.08 | 0 | 0 | 0 | 0 | 0 | 0 | 0 | 0 | 0 | 0 | 0 | 0 | 0 | 0 |
| 51 | Example | 75.42 | 18 | 6 | 0.08 | 0 | 0 | 0 | 0 | 0 | 0 | 0 | 0 | 0 | 0 | 0 | 0 | 0 | 0 |
| 52 | Example | 75.42 | 18 | 6 | 0.08 | 0 | 0 | 0 | 0 | 0 | 0 | 0 | 0 | 0 | 0 | 0 | 0 | 0 | 0 |
| 53 | Example | 75.82 | 18 | 6 | 0.08 | 0 | 0 | 0 | 0 | 0 | 0 | 0 | 0 | 0 | 0 | 0 | 0 | 0 | 0 |
| 53 | Example | 75.82 | 18 | 6 | 0.08 | 0 | 0 | 0 | 0 | 0 | 0 | 0 | 0 | 0 | 0 | 0 | 0 | 0 | 0 |
| 54 | Example | 75.82 | 18 | 6 | 0.08 | 0 | 0 | 0 | 0 | 0 | 0 | 0 | 0 | 0 | 0 | 0 | 0 | 0 | 0 |
| 55 | Example | 75.82 | 18 | 6 | 0.08 | 0 | 0 | 0 | 0 | 0 | 0 | 0 | 0 | 0 | 0 | 0 | 0 | 0 | 0 |
| 56 | Example | 75.82 | 18 | 6 | 0.08 | 0 | 0 | 0 | 0 | 0 | 0 | 0 | 0 | 0 | 0 | 0 | 0 | 0 | 0 |
| 57 | Example | 75.82 | 18 | 6 | 0.08 | 0 | 0 | 0 | 0 | 0 | 0 | 0 | 0 | 0 | 0 | 0 | 0 | 0 | 0 |
| 58 | Example | 75.82 | 18 | 6 | 0.08 | 0 | 0 | 0 | 0 | 0 | 0 | 0 | 0 | 0 | 0 | 0 | 0 | 0 | 0 |
| 59 | Example | 75.79 | 18 | 6 | 0.08 | 0 | 0 | 0 | 0 | 0 | 0 | 0 | 0 | 0 | 0 | 0 | 0 | 0 | 0 |
| 60 | Example | 75.8 | 18 | 6 | 0.08 | 0 | 0 | 0 | 0 | 0 | 0 | 0 | 0 | 0 | 0 | 0 | 0 | 0 | 0 |
| 61 | Example | 75.79 | 18 | 6 | 0.08 | 0 | 0 | 0 | 0 | 0 | 0 | 0 | 0 | 0 | 0 | 0 | 0 | 0 | 0 |
| 62 | Example | 75.79 | 18 | 6 | 0.08 | 0 | 0 | 0 | 0 | 0 | 0 | 0 | 0 | 0 | 0 | 0 | 0 | 0 | 0 |

TABLE 1-3

| | | Composition of coating layer (% by mass) | | | | | | | | | | | | |
|---|---|---|---|---|---|---|---|---|---|---|---|---|---|---|
| | | Ni | Co | V | Nb | Cu | Mn | Li | Na | K | Fe | Sr | Sb | Pb | B |
| 1 | Example | 0 | 0 | 0 | 0 | 0 | 0 | 0 | 0 | 0 | 0.1 | 0 | 0 | 0 | 0 |
| 2 | Example | 0 | 0 | 0 | 0 | 0 | 0 | 0 | 0 | 0 | 0.1 | 0 | 0 | 0 | 0 |
| 3 | Example | 0 | 0 | 0 | 0 | 0 | 0 | 0 | 0 | 0 | 0.1 | 0 | 0 | 0 | 0 |
| 4 | Example | 0 | 0 | 0 | 0 | 0 | 0 | 0 | 0 | 0 | 0.1 | 0 | 0 | 0 | 0 |
| 5 | Example | 0 | 0 | 0 | 0 | 0 | 0 | 0 | 0 | 0 | 0.1 | 0 | 0 | 0 | 0 |
| 6 | Example | 0 | 0 | 0 | 0 | 0 | 0 | 0 | 0 | 0 | 0.1 | 0 | 0 | 0 | 0 |
| 7 | Example | 0 | 0 | 0 | 0 | 0 | 0 | 0 | 0 | 0 | 0.1 | 0 | 0 | 0 | 0 |
| 8 | Example | 0 | 0 | 0 | 0 | 0 | 0 | 0 | 0 | 0 | 0.1 | 0 | 0 | 0 | 0 |
| 9 | Example | 0 | 0 | 0 | 0 | 0 | 0 | 0 | 0 | 0 | 0.1 | 0 | 0 | 0 | 0 |
| 10 | Example | 0 | 0 | 0 | 0 | 0 | 0 | 0 | 0 | 0 | 0.1 | 0 | 0 | 0 | 0 |
| 11 | Example | 0 | 0 | 0 | 0 | 0 | 0 | 0 | 0 | 0 | 0.1 | 0 | 0 | 0 | 0 |
| 12 | Example | 0 | 0 | 0 | 0 | 0 | 0 | 0 | 0 | 0 | 0.1 | 0 | 0 | 0 | 0 |
| 13 | Example | 0 | 0 | 0 | 0 | 0 | 0 | 0 | 0 | 0 | 0.1 | 0 | 0 | 0 | 0 |
| 14 | Example | 0 | 0 | 0 | 0 | 0 | 0 | 0 | 0 | 0 | 0.1 | 0 | 0 | 0 | 0 |
| 15 | Example | 0 | 0 | 0 | 0 | 0 | 0 | 0 | 0 | 0 | 0.1 | 0 | 0 | 0 | 0 |
| 16 | Example | 0 | 0 | 0 | 0 | 0 | 0 | 0 | 0 | 0 | 0.1 | 0 | 0 | 0 | 0 |
| 17 | Example | 0 | 0 | 0 | 0 | 0 | 0 | 0 | 0 | 0 | 0.08 | 0 | 0 | 0 | 0 |
| 18 | Example | 0 | 0 | 0 | 0 | 0 | 0 | 0 | 0 | 0 | 0.1 | 0 | 0 | 0 | 0 |
| 19 | Example | 0 | 0 | 0 | 0 | 0 | 0 | 0 | 0 | 0 | 0.1 | 0 | 0 | 0 | 0 |
| 20 | Example | 0 | 0 | 0 | 0 | 0 | 0 | 0 | 0 | 0 | 0.07 | 0 | 0 | 0 | 0 |
| 21 | Example | 0 | 0 | 0 | 0 | 0 | 0 | 0 | 0 | 0 | 0.1 | 0 | 0 | 0 | 0 |
| 22 | Example | 0 | 0 | 0 | 0 | 0 | 0 | 0 | 0 | 0 | 0.1 | 0 | 0 | 0 | 0 |
| 23 | Example | 0 | 0 | 0 | 0 | 0 | 0 | 0 | 0 | 0 | 0.1 | 0 | 0 | 0 | 0 |

TABLE 1-3-continued

| | | Composition of coating layer (% by mass) | | | | | | | | | | | | |
|---|---|---|---|---|---|---|---|---|---|---|---|---|---|---|
| | | Ni | Co | V | Nb | Cu | Mn | Li | Na | K | Fe | Sr | Sb | Pb | B |
| 24 | Example | 0 | 0 | 0 | 0 | 0 | 0 | 0 | 0 | 0 | 0.1 | 0 | 0 | 0 | 0 |
| 25 | Example | 0 | 0 | 0 | 0 | 0 | 0 | 0 | 0 | 0 | 0.1 | 0 | 0 | 0 | 0 |
| 26 | Example | 0 | 0 | 0 | 0 | 0 | 0 | 0 | 0 | 0 | 0.1 | 0 | 0 | 0 | 0 |
| 27 | Example | 0 | 0 | 0 | 0 | 0 | 0 | 0 | 0 | 0 | 0.1 | 0 | 0 | 0 | 0 |
| 28 | Example | 0 | 0 | 0 | 0 | 0 | 0 | 0 | 0 | 0 | 0.1 | 0 | 0 | 0 | 0 |
| 29 | Example | 0 | 0 | 0 | 0 | 0 | 0 | 0 | 0 | 0 | 0.1 | 0 | 0 | 0 | 0 |
| 30 | Example | 0 | 0 | 0 | 0 | 0 | 0 | 0 | 0 | 0 | 0.1 | 0 | 0 | 0 | 0 |
| 31 | Example | 0 | 0 | 0 | 0 | 0 | 0 | 0 | 0 | 0 | 0.1 | 0 | 0 | 0 | 0 |
| 32 | Example | 0 | 0 | 0 | 0 | 0 | 0 | 0 | 0 | 0 | 0.1 | 0 | 0 | 0 | 0 |
| 33 | Example | 0 | 0 | 0 | 0 | 0 | 0 | 0 | 0 | 0 | 0.1 | 0 | 0 | 0 | 0 |
| 34 | Example | 0 | 0 | 0 | 0 | 0 | 0 | 0 | 0 | 0 | 0.1 | 0 | 0 | 0 | 0 |
| 35 | Example | 0 | 0 | 0 | 0 | 0 | 0 | 0 | 0 | 0 | 0.1 | 0 | 0 | 0 | 0 |
| 36 | Example | 0 | 0 | 0 | 0 | 0 | 0 | 0 | 0 | 0 | 0.1 | 0 | 0 | 0 | 0 |
| 37 | Example | 0 | 0 | 0 | 0 | 0 | 0 | 0 | 0 | 0 | 0.1 | 0 | 0 | 0 | 0 |
| 38 | Example | 0.2 | 0 | 0 | 0 | 0 | 0 | 0 | 0 | 0 | 0.1 | 0 | 0 | 0 | 0 |
| 39 | Example | 0 | 0.2 | 0 | 0 | 0 | 0 | 0 | 0 | 0 | 0.1 | 0 | 0 | 0 | 0 |
| 40 | Example | 0 | 0 | 0.2 | 0 | 0 | 0 | 0 | 0 | 0 | 0.1 | 0 | 0 | 0 | 0 |
| 41 | Example | 0 | 0 | 0 | 0.2 | 0 | 0 | 0 | 0 | 0 | 0.1 | 0 | 0 | 0 | 0 |
| 42 | Example | 0 | 0 | 0 | 0 | 0.2 | 0 | 0 | 0 | 0 | 0.1 | 0 | 0 | 0 | 0 |
| 43 | Example | 0 | 0 | 0 | 0 | 0 | 0.2 | 0 | 0 | 0 | 0.1 | 0 | 0 | 0 | 0 |
| 44 | Example | 0 | 0 | 0 | 0 | 0 | 0 | 0.2 | 0 | 0 | 0.1 | 0 | 0 | 0 | 0 |
| 45 | Example | 0 | 0 | 0 | 0 | 0 | 0 | 0 | 0.2 | 0 | 0.1 | 0 | 0 | 0 | 0 |
| 46 | Example | 0 | 0 | 0 | 0 | 0 | 0 | 0 | 0 | 0.2 | 0.1 | 0 | 0 | 0 | 0 |
| 47 | Example | 0 | 0 | 0 | 0 | 0 | 0 | 0 | 0 | 0 | 5 | 0 | 0 | 0 | 0 |
| 48 | Example | 0 | 0 | 0 | 0 | 0 | 0 | 0 | 0 | 0 | 5 | 0 | 0 | 0 | 0 |
| 49 | Example | 0 | 0 | 0 | 0 | 0 | 0 | 0 | 0 | 0 | 0.1 | 0.4 | 0 | 0 | 0 |
| 50 | Example | 0 | 0 | 0 | 0 | 0 | 0 | 0 | 0 | 0 | 0.1 | 0 | 0.4 | 0 | 0 |
| 51 | Example | 0 | 0 | 0 | 0 | 0 | 0 | 0 | 0 | 0 | 0.1 | 0 | 0 | 0.4 | 0 |
| 52 | Example | 0 | 0 | 0 | 0 | 0 | 0 | 0 | 0 | 0 | 0.1 | 0 | 0 | 0 | 0.4 |
| 53 | Example | 0 | 0 | 0 | 0 | 0 | 0 | 0 | 0 | 0 | 0.1 | 0 | 0 | 0 | 0 |
| 53 | Example | 0 | 0 | 0 | 0 | 0 | 0 | 0 | 0 | 0 | 0.1 | 0 | 0 | 0 | 0 |
| 54 | Example | 0 | 0 | 0 | 0 | 0 | 0 | 0 | 0 | 0 | 0.1 | 0 | 0 | 0 | 0 |
| 55 | Example | 0 | 0 | 0 | 0 | 0 | 0 | 0 | 0 | 0 | 0.1 | 0 | 0 | 0 | 0 |
| 56 | Example | 0 | 0 | 0 | 0 | 0 | 0 | 0 | 0 | 0 | 0.1 | 0 | 0 | 0 | 0 |
| 57 | Example | 0 | 0 | 0 | 0 | 0 | 0 | 0 | 0 | 0 | 0.1 | 0 | 0 | 0 | 0 |
| 58 | Example | 0 | 0 | 0 | 0 | 0 | 0 | 0 | 0 | 0 | 0.1 | 0 | 0 | 0 | 0 |
| 59 | Example | 0.03 | 0 | 0 | 0 | 0 | 0 | 0 | 0 | 0 | 0.1 | 0 | 0 | 0 | 0 |
| 60 | Example | 0.02 | 0 | 0 | 0 | 0 | 0 | 0 | 0 | 0 | 0.1 | 0 | 0 | 0 | 0 |
| 61 | Example | 0.03 | 0 | 0 | 0 | 0 | 0 | 0 | 0 | 0 | 0.1 | 0 | 0 | 0 | 0 |
| 62 | Example | 0.03 | 0 | 0 | 0 | 0 | 0 | 0 | 0 | 0 | 0.1 | 0 | 0 | 0 | 0 |

TABLE 1-4

| No. | Classification | Layer thickness ratio of coating layer of flat part | convex part sheet thickness T (mm) | flat part sheet thickness t (mm) | Gap height x (mm) | x/(T − t) | T − t | Thickness of Al—Fe alloy layer (μm) | Flatness | Corrosion resistance | Formability |
|---|---|---|---|---|---|---|---|---|---|---|---|
| 1 | Example | 2.6 | 3.6 | 2.3 | 1 | 0.77 | 1.3 | 1 | A+ | B | A+ |
| 2 | Example | 2.6 | 3.6 | 2.3 | 1 | 0.77 | 1.3 | 1 | A+ | B | A+ |
| 3 | Example | 2.5 | 3.6 | 2.3 | 1 | 0.77 | 1.3 | 1 | A+ | A | A |
| 4 | Example | 2.6 | 3.6 | 2.3 | 1 | 0.77 | 1.3 | 1 | A+ | A | A |
| 5 | Example | 2.6 | 3.6 | 2.3 | 1 | 0.77 | 1.3 | 1 | A+ | A+ | A |
| 6 | Example | 2.6 | 3.6 | 2.3 | 1 | 0.77 | 1.3 | 1 | A+ | A+ | A |
| 7 | Example | 2.7 | 3.6 | 2.3 | 1 | 0.77 | 1.3 | 1 | A+ | A+ | B |
| 8 | Example | 2.6 | 3.6 | 2.3 | 1 | 0.77 | 1.3 | 1 | A+ | A+ | A |
| 9 | Example | 2.8 | 3.6 | 2.3 | 1 | 0.77 | 1.3 | 1 | A+ | A+ | A |
| 10 | Example | 2.6 | 3.6 | 2.3 | 1 | 0.77 | 1.3 | 1 | A+ | A+ | A |
| 11 | Example | 2.6 | 3.6 | 2.3 | 1 | 0.77 | 1.3 | 1 | A+ | A+ | A |
| 12 | Example | 2.5 | 3.6 | 2.3 | 1 | 0.77 | 1.3 | 1 | A+ | A+ | A |
| 13 | Example | 2.5 | 3.6 | 2.3 | 1 | 0.77 | 1.3 | 1 | A+ | A+ | A |
| 14 | Example | 2.6 | 3.6 | 2.3 | 1 | 0.77 | 1.3 | 1 | A+ | A+ | A |
| 15 | Example | 2.6 | 3.6 | 2.3 | 1 | 0.77 | 1.3 | 1 | A+ | A+ | A |
| 16 | Example | 2.7 | 3.6 | 2.3 | 1 | 0.77 | 1.3 | 1 | A+ | A+ | A |
| 17 | Example | 2.8 | 3.6 | 2.3 | 1 | 0.77 | 1.3 | 1 | A+ | A+ | A |
| 18 | Example | 2.6 | 3.6 | 2.3 | 1 | 0.77 | 1.3 | 1 | A+ | A+ | A |
| 19 | Example | 2.6 | 3.6 | 2.3 | 1 | 0.77 | 1.3 | 1 | A+ | A+ | A |
| 20 | Example | 2.6 | 3.6 | 2.3 | 1 | 0.77 | 1.3 | 1 | A+ | A+ | A |
| 21 | Example | 2.5 | 3.6 | 2.3 | 1 | 0.77 | 1.3 | 1 | A+ | A+ | A |
| 22 | Example | 2.7 | 3.6 | 2.3 | 1 | 0.77 | 1.3 | 1 | A+ | A+ | A |
| 23 | Example | 2.6 | 3.6 | 2.3 | 1 | 0.77 | 1.3 | 1 | A+ | A+ | A |

TABLE 1-4-continued

| No. | Classification | Layer thickness ratio of coating layer of flat part | convex part sheet thickness T (mm) | flat part sheet thickness t (mm) | Gap height x (mm) | x/(T − t) | T − t | Thickness of Al—Fe alloy layer (μm) | Flatness | Corrosion resistance | Formability |
|---|---|---|---|---|---|---|---|---|---|---|---|
| 24 | Example | 2.6 | 3.6 | 2.3 | 1 | 0.77 | 1.3 | 1 | A+ | A+ | A |
| 25 | Example | 2.6 | 3.6 | 2.3 | 1 | 0.77 | 1.3 | 1 | A+ | A+ | A |
| 26 | Example | 2.8 | 3.6 | 2.3 | 1 | 0.77 | 1.3 | 1 | A+ | A+ | A |
| 27 | Example | 2.6 | 3.6 | 2.3 | 1 | 0.77 | 1.3 | 1 | A+ | A+ | A |
| 28 | Example | 2.6 | 3.6 | 2.3 | 1 | 0.77 | 1.3 | 1 | A+ | A+ | A |
| 29 | Example | 2.4 | 3.6 | 2.3 | 1 | 0.77 | 1.3 | 1 | A+ | A+ | A |
| 30 | Example | 2.6 | 3.6 | 2.3 | 1 | 0.77 | 1.3 | 1 | A+ | A+ | A |
| 31 | Example | 2.7 | 3.6 | 2.3 | 1 | 0.77 | 1.3 | 1 | A+ | A+ | A |
| 32 | Example | 2.6 | 3.6 | 2.3 | 1 | 0.77 | 1.3 | 1 | A+ | A+ | A |
| 33 | Example | 2.6 | 3.6 | 2.3 | 1 | 0.77 | 1.3 | 1 | A+ | A+ | A |
| 34 | Example | 2.6 | 3.6 | 2.3 | 1 | 0.77 | 1.3 | 1 | A+ | A+ | A |
| 35 | Example | 2.8 | 3.6 | 2.3 | 1 | 0.77 | 1.3 | 1 | A+ | A+ | A |
| 36 | Example | 2.6 | 3.6 | 2.3 | 1 | 0.77 | 1.3 | 1 | A+ | A+ | A |
| 37 | Example | 2.6 | 3.6 | 2.3 | 1 | 0.77 | 1.3 | 1 | A+ | A+ | A |
| 38 | Example | 2.5 | 3.6 | 2.3 | 1 | 0.77 | 1.3 | 1 | A+ | A+ | A |
| 39 | Example | 2.7 | 3.6 | 2.3 | 1 | 0.77 | 1.3 | 1 | A+ | A+ | A |
| 40 | Example | 2.6 | 3.6 | 2.3 | 1 | 0.77 | 1.3 | 1 | A+ | A+ | A |
| 41 | Example | 2.6 | 3.6 | 2.3 | 1 | 0.77 | 1.3 | 1 | A+ | A+ | A |
| 42 | Example | 2.8 | 3.6 | 2.3 | 1 | 0.77 | 1.3 | 1 | A+ | A+ | A |
| 43 | Example | 2.6 | 3.6 | 2.3 | 1 | 0.77 | 1.3 | 1 | A+ | A+ | A |
| 44 | Example | 2.5 | 3.6 | 2.3 | 1 | 0.77 | 1.3 | 1 | A+ | A+ | A |
| 45 | Example | 2.6 | 3.6 | 2.3 | 1 | 0.77 | 1.3 | 1 | A+ | A+ | A |
| 46 | Example | 2.6 | 3.6 | 2.3 | 1 | 0.77 | 1.3 | 1 | A+ | A+ | A |
| 47 | Example | 2.5 | 3.6 | 2.3 | 1 | 0.77 | 1.3 | 5 | A+ | A | B |
| 48 | Example | 2.6 | 3.6 | 2.3 | 1 | 0.77 | 1.3 | 4 | A+ | A | B |
| 49 | Example | 2.4 | 3.6 | 2.3 | 1 | 0.77 | 1.3 | 1 | A+ | A+ | A |
| 50 | Example | 2.6 | 3.6 | 2.3 | 1 | 0.77 | 1.3 | 1 | A+ | A+ | A |
| 51 | Example | 2.6 | 3.6 | 2.3 | 1 | 0.77 | 1.3 | 1 | A+ | A+ | A |
| 52 | Example | 2.6 | 3.6 | 2.3 | 1 | 0.77 | 1.3 | 1 | A+ | A+ | A |
| 53 | Example | 0.25 | 3.6 | 2.3 | 1.4 | 1.08 | 1.3 | 1 | A+ | A | B |
| 53 | Example | 4 | 3.6 | 2.3 | 1.5 | 1.15 | 1.3 | 1 | A+ | A | B |
| 54 | Example | 4 | 3.6 | 2.3 | 1.5 | 1.15 | 1.3 | 1 | A+ | A | B |
| 55 | Example | 4.7 | 3.6 | 2.3 | 1.9 | 1.46 | 1.3 | 1 | A | B | B |
| 56 | Example | 2 | 2.5 | 1.6 | 0.7 | 0.78 | 0.9 | 1 | A+ | A | A |
| 57 | Example | 3.5 | 6 | 4.5 | 1.9 | 1.27 | 1.5 | 1 | A | A | A |
| 58 | Example | 4.2 | 7.7 | 6 | 2.1 | 1.24 | 1.7 | 1 | A | B | B |
| 59 | Example | 2.6 | 3.6 | 2.3 | 1 | 0.77 | 1.3 | 1 | A+ | A+ | A |
| 60 | Example | 2.6 | 3.6 | 2.3 | 1 | 0.77 | 1.3 | 1 | A+ | A+ | A |
| 61 | Example | 2.6 | 3.6 | 2.3 | 1 | 0.77 | 1.3 | 1 | A+ | A+ | A |
| 62 | Example | 2.6 | 3.6 | 2.3 | 1 | 0.77 | 1.3 | 1 | A+ | A+ | A |

TABLE 2-1

| No. | Classification | substrate checkered steel sheet | Melting point of coating bath (° C.) | Temperature of coating bath (° C.) | Heating ultimate temperature (° C.) | Heating rate (° C./s) | Cooling rate (° C./s) | Immersion time (second) | Cooling after coating Cooling rate to 500° C. (° C./s) |
|---|---|---|---|---|---|---|---|---|---|
| 63 | Comparative Example | — | 480 | 500 | 820 | 10 | 10 | 2 | — |
| 64 | Comparative Example | — | 380 | 400 | 820 | 10 | 10 | 2 | — |
| 65 | Comparative Example | — | 470 | 490 | 820 | 10 | 10 | 2 | — |
| 66 | Comparative Example | — | 450 | 470 | 820 | 10 | 10 | 2 | — |
| 67 | Comparative Example | — | 470 | 490 | 820 | 10 | 10 | 2 | — |
| 68 | Comparative Example | — | 460 | 480 | 820 | 10 | 10 | 2 | — |
| 69 | Comparative Example | — | 460 | 480 | 820 | 10 | 10 | 2 | — |
| 70 | Comparative Example | — | 460 | 480 | 820 | 10 | 10 | 2 | — |
| 71 | Comparative Example | — | 460 | 480 | 820 | 10 | 10 | 2 | — |
| 72 | Comparative Example | — | 460 | 480 | 820 | 10 | 10 | 2 | — |
| 73 | Comparative Example | — | 460 | 480 | 820 | 10 | 10 | 2 | — |
| 74 | Comparative Example | — | 460 | 480 | 820 | 10 | 10 | 2 | — |
| 75 | Comparative Example | — | 470 | 490 | 820 | 10 | 10 | 2 | — |
| 76 | Comparative Example | — | 460 | 480 | 820 | 10 | 10 | 2 | — |
| 77 | Comparative Example | — | 460 | 480 | 820 | 10 | 10 | 2 | — |
| 78 | Comparative Example | — | 460 | 480 | 820 | 10 | 10 | 2 | — |
| 79 | Comparative Example | — | 460 | 480 | 820 | 10 | 10 | 2 | — |
| 80 | Comparative Example | — | 460 | 480 | 820 | 10 | 10 | 2 | — |
| 81 | Comparative Example | — | 460 | 480 | 820 | 10 | 10 | 2 | — |

TABLE 2-1-continued

| No. | Classification | Melting substrate checkered steel sheet | point of coating bath (° C.) | Temperature of coating bath (° C.) | Heating ultimate temperature (° C.) | Heating rate (° C./s) | Cooling rate (° C./s) | Immersion time (second) | Cooling after coating Cooling rate to 500° C. (° C./s) |
|---|---|---|---|---|---|---|---|---|---|
| 82 | Comparative Example | — | 460 | 480 | 820 | 10 | 10 | 2 | — |
| 83 | Comparative Example | — | 460 | 480 | 820 | 10 | 10 | 2 | — |
| 84 | Comparative Example | — | 460 | 480 | 820 | 10 | 10 | 2 | — |
| 85 | Comparative Example | — | 460 | 480 | 820 | 10 | 10 | 2 | — |
| 86 | Comparative Example | — | 460 | 480 | 820 | 10 | 10 | 2 | — |
| 87 | Comparative Example | — | 460 | 480 | 820 | 10 | 10 | 2 | — |
| 88 | Comparative Example | — | 460 | 480 | 820 | 10 | 10 | 2 | — |
| 89 | Comparative Example | — | 460 | 480 | 820 | 10 | 10 | 2 | — |
| 90 | Comparative Example | — | 460 | 480 | 820 | 10 | 10 | 2 | — |
| 91 | Comparative Example | — | 460 | 480 | 820 | 10 | 10 | 2 | — |
| 92 | Comparative Example | — | 460 | 570 | 820 | 10 | 10 | 2 | 10 |
| 93 | Comparative Example | — | 460 | 480 | 820 | 10 | 10 | 2 | — |
| 94 | Comparative Example | — | 460 | 480 | 820 | 10 | 10 | 2 | — |
| 95 | Comparative Example | — | 460 | 480 | 820 | 10 | 10 | 2 | — |
| 96 | Comparative Example | — | 460 | 480 | 820 | 10 | 10 | 2 | — |
| 97 | Comparative Example | — | 460 | 480 | 880 | 10 | 10 | 2 | — |
| 98 | Comparative Example | — | 460 | 480 | 820 | 30 | 10 | 2 | — |
| 99 | Comparative Example | — | 460 | 480 | 820 | 10 | 30 | 2 | — |
| 100 | Comparative Example | — | 460 | 480 | 820 | 30 | 30 | 2 | — |
| 101 | Comparative Example | — | 460 | 550 | 820 | 10 | 10 | 2 | 30 |
| 102 | Comparative Example | — | 460 | 480 | 820 | 10 | 10 | 2 | — |
| 103 | Comparative Example | — | 460 | 480 | 820 | 4.3 | 10 | 2 | — |
| 104 | Comparative Example | — | 460 | 480 | 820 | 10 | 4.1 | 2 | — |
| 105 | Comparative Example | — | 460 | 550 | 820 | 10 | 10 | 2 | 4 |

TABLE 2-2

| No. | Classification | Composition of coating layer (% by mass) | | | | | | | | | | | | | | | | | |
|---|---|---|---|---|---|---|---|---|---|---|---|---|---|---|---|---|---|---|---|
| | | Zn | Al | Mg | Sn | Bi | In | Ca | Y | La | Ce | Si | Cr | Ti | Zr | Mo | W | Ag | P |
| 63 | Comparative Example | 63.9 | 24 | 12 | 0 | 0 | 0 | 0 | 0 | 0 | 0 | 0 | 0 | 0 | 0 | 0 | 0 | 0 | 0 |
| 64 | Comparative Example | 93.4 | 0.5 | 6 | 0 | 0 | 0 | 0 | 0 | 0 | 0 | 0 | 0 | 0 | 0 | 0 | 0 | 0 | 0 |
| 65 | Comparative Example | 67.9 | 26 | 6 | 0 | 0 | 0 | 0 | 0 | 0 | 0 | 0 | 0 | 0 | 0 | 0 | 0 | 0 | 0 |
| 66 | Comparative Example | 81.4 | 18 | 0.5 | 0 | 0 | 0 | 0 | 0 | 0 | 0 | 0 | 0 | 0 | 0 | 0 | 0 | 0 | 0 |
| 67 | Comparative Example | 68.9 | 18 | 13 | 0 | 0 | 0 | 0 | 0 | 0 | 0 | 0 | 0 | 0 | 0 | 0 | 0 | 0 | 0 |
| 68 | Comparative Example | 70.4 | 18 | 6 | 5.50 | 0 | 0 | 0 | 0 | 0 | 0 | 0 | 0 | 0 | 0 | 0 | 0 | 0 | 0 |
| 69 | Comparative Example | 70.82 | 18 | 6 | 0.08 | 5 | 0 | 0 | 0 | 0 | 0 | 0 | 0 | 0 | 0 | 0 | 0 | 0 | 0 |
| 70 | Comparative Example | 73.82 | 18 | 6 | 0.08 | 0 | 2 | 0 | 0 | 0 | 0 | 0 | 0 | 0 | 0 | 0 | 0 | 0 | 0 |
| 71 | Comparative Example | 72.32 | 18 | 6 | 0.08 | 0 | 0 | 3.5 | 0 | 0 | 0 | 0 | 0 | 0 | 0 | 0 | 0 | 0 | 0 |
| 72 | Comparative Example | 75.22 | 18 | 6 | 0.08 | 0 | 0 | 0 | 0.6 | 0 | 0 | 0 | 0 | 0 | 0 | 0 | 0 | 0 | 0 |
| 73 | Comparative Example | 75.22 | 18 | 6 | 0.08 | 0 | 0 | 0 | 0 | 0.6 | 0 | 0 | 0 | 0 | 0 | 0 | 0 | 0 | 0 |
| 74 | Comparative Example | 75.22 | 18 | 6 | 0.08 | 0 | 0 | 0 | 0 | 0 | 0.6 | 0 | 0 | 0 | 0 | 0 | 0 | 0 | 0 |
| 75 | Comparative Example | 73.12 | 18 | 6 | 0.08 | 0 | 0 | 0 | 0 | 0 | 0 | 2.7 | 0 | 0 | 0 | 0 | 0 | 0 | 0 |
| 76 | Comparative Example | 75.52 | 18 | 6 | 0.08 | 0 | 0 | 0 | 0 | 0 | 0 | 0 | 0.3 | 0 | 0 | 0 | 0 | 0 | 0 |
| 77 | Comparative Example | 75.52 | 18 | 6 | 0.08 | 0 | 0 | 0 | 0 | 0 | 0 | 0 | 0 | 0.3 | 0 | 0 | 0 | 0 | 0 |
| 78 | Comparative Example | 75.52 | 18 | 6 | 0.08 | 0 | 0 | 0 | 0 | 0 | 0 | 0 | 0 | 0 | 0.3 | 0 | 0 | 0 | 0 |
| 79 | Comparative Example | 75.52 | 18 | 6 | 0.08 | 0 | 0 | 0 | 0 | 0 | 0 | 0 | 0 | 0 | 0 | 0.3 | 0 | 0 | 0 |
| 80 | Comparative Example | 75.52 | 18 | 6 | 0.08 | 0 | 0 | 0 | 0 | 0 | 0 | 0 | 0 | 0 | 0 | 0 | 0.3 | 0 | 0 |
| 81 | Comparative Example | 75.52 | 18 | 6 | 0.08 | 0 | 0 | 0 | 0 | 0 | 0 | 0 | 0 | 0 | 0 | 0 | 0 | 0.3 | 0 |
| 82 | Comparative Example | 75.52 | 18 | 6 | 0.08 | 0 | 0 | 0 | 0 | 0 | 0 | 0 | 0 | 0 | 0 | 0 | 0 | 0 | 0.3 |
| 83 | Comparative Example | 75.52 | 18 | 6 | 0.08 | 0 | 0 | 0 | 0 | 0 | 0 | 0 | 0 | 0 | 0 | 0 | 0 | 0 | 0 |
| 84 | Comparative Example | 75.52 | 18 | 6 | 0.08 | 0 | 0 | 0 | 0 | 0 | 0 | 0 | 0 | 0 | 0 | 0 | 0 | 0 | 0 |
| 85 | Comparative Example | 75.52 | 18 | 6 | 0.08 | 0 | 0 | 0 | 0 | 0 | 0 | 0 | 0 | 0 | 0 | 0 | 0 | 0 | 0 |
| 86 | Comparative Example | 75.52 | 18 | 6 | 0.08 | 0 | 0 | 0 | 0 | 0 | 0 | 0 | 0 | 0 | 0 | 0 | 0 | 0 | 0 |
| 87 | Comparative Example | 75.52 | 18 | 6 | 0.08 | 0 | 0 | 0 | 0 | 0 | 0 | 0 | 0 | 0 | 0 | 0 | 0 | 0 | 0 |
| 88 | Comparative Example | 75.52 | 18 | 6 | 0.08 | 0 | 0 | 0 | 0 | 0 | 0 | 0 | 0 | 0 | 0 | 0 | 0 | 0 | 0 |
| 89 | Comparative Example | 75.52 | 18 | 6 | 0.08 | 0 | 0 | 0 | 0 | 0 | 0 | 0 | 0 | 0 | 0 | 0 | 0 | 0 | 0 |
| 90 | Comparative Example | 75.52 | 18 | 6 | 0.08 | 0 | 0 | 0 | 0 | 0 | 0 | 0 | 0 | 0 | 0 | 0 | 0 | 0 | 0 |
| 91 | Comparative Example | 75.52 | 18 | 6 | 0.08 | 0 | 0 | 0 | 0 | 0 | 0 | 0 | 0 | 0 | 0 | 0 | 0 | 0 | 0 |
| 92 | Comparative Example | 68.92 | 18 | 6 | 0.08 | 0 | 0 | 0 | 0 | 0 | 0 | 0 | 0 | 0 | 0 | 0 | 0 | 0 | 0 |
| 93 | Comparative Example | 75.32 | 18 | 6 | 0.08 | 0 | 0 | 0 | 0 | 0 | 0 | 0 | 0 | 0 | 0 | 0 | 0 | 0 | 0 |
| 94 | Comparative Example | 75.32 | 18 | 6 | 0.08 | 0 | 0 | 0 | 0 | 0 | 0 | 0 | 0 | 0 | 0 | 0 | 0 | 0 | 0 |
| 95 | Comparative Example | 75.32 | 18 | 6 | 0.08 | 0 | 0 | 0 | 0 | 0 | 0 | 0 | 0 | 0 | 0 | 0 | 0 | 0 | 0 |
| 96 | Comparative Example | 75.22 | 18 | 6 | 0.08 | 0 | 0 | 0 | 0 | 0 | 0 | 0 | 0 | 0 | 0 | 0 | 0 | 0 | 0 |
| 97 | Comparative Example | 75.82 | 18 | 6 | 0.08 | 0 | 0 | 0 | 0 | 0 | 0 | 0 | 0 | 0 | 0 | 0 | 0 | 0 | 0 |
| 98 | Comparative Example | 75.82 | 18 | 6 | 0.08 | 0 | 0 | 0 | 0 | 0 | 0 | 0 | 0 | 0 | 0 | 0 | 0 | 0 | 0 |
| 99 | Comparative Example | 75.82 | 18 | 6 | 0.08 | 0 | 0 | 0 | 0 | 0 | 0 | 0 | 0 | 0 | 0 | 0 | 0 | 0 | 0 |
| 100 | Comparative Example | 75.82 | 18 | 6 | 0.08 | 0 | 0 | 0 | 0 | 0 | 0 | 0 | 0 | 0 | 0 | 0 | 0 | 0 | 0 |

TABLE 2-2-continued

| | | Composition of coating layer (% by mass) | | | | | | | | | | | | | | | | |
|---|---|---|---|---|---|---|---|---|---|---|---|---|---|---|---|---|---|---|
| No. | Classification | Zn | Al | Mg | Sn | Bi | In | Ca | Y | La | Ce | Si | Cr | Ti | Zr | Mo | W | Ag | P |
| 101 | Comparative Example | 75.82 | 18 | 6 | 0.08 | 0 | 0 | 0 | 0 | 0 | 0 | 0 | 0 | 0 | 0 | 0 | 0 | 0 | 0 |
| 102 | Comparative Example | 75.82 | 18 | 6 | 0.08 | 0 | 0 | 0 | 0 | 0 | 0 | 0 | 0 | 0 | 0 | 0 | 0 | 0 | 0 |
| 103 | Comparative Example | 75.82 | 18 | 6 | 0.08 | 0 | 0 | 0 | 0 | 0 | 0 | 0 | 0 | 0 | 0 | 0 | 0 | 0 | 0 |
| 104 | Comparative Example | 75.82 | 18 | 6 | 0.08 | 0 | 0 | 0 | 0 | 0 | 0 | 0 | 0 | 0 | 0 | 0 | 0 | 0 | 0 |
| 105 | Comparative Example | 75.82 | 18 | 6 | 0.08 | 0 | 0 | 0 | 0 | 0 | 0 | 0 | 0 | 0 | 0 | 0 | 0 | 0 | 0 |

TABLE 2-3

| | | Composition of coating layer (% by mass) | | | | | | | | | | | | |
|---|---|---|---|---|---|---|---|---|---|---|---|---|---|---|
| No. | Classification | Ni | Co | V | Nb | Cu | Mn | Li | Na | K | Fe | Sr | Sb | Pb | B |
| 63 | Comparative Example | 0 | 0 | 0 | 0 | 0 | 0 | 0 | 0 | 0 | 0.1 | 0 | 0 | 0 | 0 |
| 64 | Comparative Example | 0 | 0 | 0 | 0 | 0 | 0 | 0 | 0 | 0 | 0.1 | 0 | 0 | 0 | 0 |
| 65 | Comparative Example | 0 | 0 | 0 | 0 | 0 | 0 | 0 | 0 | 0 | 0.1 | 0 | 0 | 0 | 0 |
| 66 | Comparative Example | 0 | 0 | 0 | 0 | 0 | 0 | 0 | 0 | 0 | 0.1 | 0 | 0 | 0 | 0 |
| 67 | Comparative Example | 0 | 0 | 0 | 0 | 0 | 0 | 0 | 0 | 0 | 0.1 | 0 | 0 | 0 | 0 |
| 68 | Comparative Example | 0 | 0 | 0 | 0 | 0 | 0 | 0 | 0 | 0 | 0.1 | 0 | 0 | 0 | 0 |
| 69 | Comparative Example | 0 | 0 | 0 | 0 | 0 | 0 | 0 | 0 | 0 | 0.1 | 0 | 0 | 0 | 0 |
| 70 | Comparative Example | 0 | 0 | 0 | 0 | 0 | 0 | 0 | 0 | 0 | 0.1 | 0 | 0 | 0 | 0 |
| 71 | Comparative Example | 0 | 0 | 0 | 0 | 0 | 0 | 0 | 0 | 0 | 0.1 | 0 | 0 | 0 | 0 |
| 72 | Comparative Example | 0 | 0 | 0 | 0 | 0 | 0 | 0 | 0 | 0 | 0.1 | 0 | 0 | 0 | 0 |
| 73 | Comparative Example | 0 | 0 | 0 | 0 | 0 | 0 | 0 | 0 | 0 | 0.1 | 0 | 0 | 0 | 0 |
| 74 | Comparative Example | 0 | 0 | 0 | 0 | 0 | 0 | 0 | 0 | 0 | 0.1 | 0 | 0 | 0 | 0 |
| 75 | Comparative Example | 0 | 0 | 0 | 0 | 0 | 0 | 0 | 0 | 0 | 0.1 | 0 | 0 | 0 | 0 |
| 76 | Comparative Example | 0 | 0 | 0 | 0 | 0 | 0 | 0 | 0 | 0 | 0.1 | 0 | 0 | 0 | 0 |
| 77 | Comparative Example | 0 | 0 | 0 | 0 | 0 | 0 | 0 | 0 | 0 | 0.1 | 0 | 0 | 0 | 0 |
| 78 | Comparative Example | 0 | 0 | 0 | 0 | 0 | 0 | 0 | 0 | 0 | 0.1 | 0 | 0 | 0 | 0 |
| 79 | Comparative Example | 0 | 0 | 0 | 0 | 0 | 0 | 0 | 0 | 0 | 0.1 | 0 | 0 | 0 | 0 |
| 80 | Comparative Example | 0 | 0 | 0 | 0 | 0 | 0 | 0 | 0 | 0 | 0.1 | 0 | 0 | 0 | 0 |
| 81 | Comparative Example | 0 | 0 | 0 | 0 | 0 | 0 | 0 | 0 | 0 | 0.1 | 0 | 0 | 0 | 0 |
| 82 | Comparative Example | 0 | 0 | 0 | 0 | 0 | 0 | 0 | 0 | 0 | 0.1 | 0 | 0 | 0 | 0 |
| 83 | Comparative Example | 0.3 | 0 | 0 | 0 | 0 | 0 | 0 | 0 | 0 | 0.1 | 0 | 0 | 0 | 0 |
| 84 | Comparative Example | 0 | 0.3 | 0 | 0 | 0 | 0 | 0 | 0 | 0 | 0.1 | 0 | 0 | 0 | 0 |
| 85 | Comparative Example | 0 | 0 | 0.3 | 0 | 0 | 0 | 0 | 0 | 0 | 0.1 | 0 | 0 | 0 | 0 |
| 86 | Comparative Example | 0 | 0 | 0 | 0.3 | 0 | 0 | 0 | 0 | 0 | 0.1 | 0 | 0 | 0 | 0 |
| 87 | Comparative Example | 0 | 0 | 0 | 0 | 0.3 | 0 | 0 | 0 | 0 | 0.1 | 0 | 0 | 0 | 0 |
| 88 | Comparative Example | 0 | 0 | 0 | 0 | 0 | 0.3 | 0 | 0 | 0 | 0.1 | 0 | 0 | 0 | 0 |
| 89 | Comparative Example | 0 | 0 | 0 | 0 | 0 | 0 | 0.3 | 0 | 0 | 0.1 | 0 | 0 | 0 | 0 |
| 90 | Comparative Example | 0 | 0 | 0 | 0 | 0 | 0 | 0 | 0.3 | 0 | 0.1 | 0 | 0 | 0 | 0 |
| 91 | Comparative Example | 0 | 0 | 0 | 0 | 0 | 0 | 0 | 0 | 0.3 | 0.1 | 0 | 0 | 0 | 0 |
| 92 | Comparative Example | 0 | 0 | 0 | 0 | 0 | 0 | 0 | 0 | 0 | 7 | 0 | 0 | 0 | 0 |
| 93 | Comparative Example | 0 | 0 | 0 | 0 | 0 | 0 | 0 | 0 | 0 | 0 | 0.6 | 0 | 0 | 0 |
| 94 | Comparative Example | 0 | 0 | 0 | 0 | 0 | 0 | 0 | 0 | 0 | 0 | 0 | 0.6 | 0 | 0 |
| 95 | Comparative Example | 0 | 0 | 0 | 0 | 0 | 0 | 0 | 0 | 0 | 0 | 0 | 0 | 0.6 | 0 |
| 96 | Comparative Example | 0 | 0 | 0 | 0 | 0 | 0 | 0 | 0 | 0 | 0.1 | 0 | 0 | 0 | 0.6 |
| 97 | Comparative Example | 0 | 0 | 0 | 0 | 0 | 0 | 0 | 0 | 0 | 0.1 | 0 | 0 | 0 | 0 |
| 98 | Comparative Example | 0 | 0 | 0 | 0 | 0 | 0 | 0 | 0 | 0 | 0.1 | 0 | 0 | 0 | 0 |
| 99 | Comparative Example | 0 | 0 | 0 | 0 | 0 | 0 | 0 | 0 | 0 | 0.1 | 0 | 0 | 0 | 0 |
| 100 | Comparative Example | 0 | 0 | 0 | 0 | 0 | 0 | 0 | 0 | 0 | 0.1 | 0 | 0 | 0 | 0 |
| 101 | Comparative Example | 0 | 0 | 0 | 0 | 0 | 0 | 0 | 0 | 0 | 0.1 | 0 | 0 | 0 | 0 |
| 102 | Comparative Example | 0 | 0 | 0 | 0 | 0 | 0 | 0 | 0 | 0 | 0.1 | 0 | 0 | 0 | 0 |
| 103 | Comparative Example | 0 | 0 | 0 | 0 | 0 | 0 | 0 | 0 | 0 | 0.1 | 0 | 0 | 0 | 0 |
| 104 | Comparative Example | 0 | 0 | 0 | 0 | 0 | 0 | 0 | 0 | 0 | 0.1 | 0 | 0 | 0 | 0 |
| 105 | Comparative Example | 0 | 0 | 0 | 0 | 0 | 0 | 0 | 0 | 0 | 0.1 | 0 | 0 | 0 | 0 |

TABLE 2-4

| No. | Classification | Layer thickness ratio of coating layer of flat part | convex part sheet thickness T (mm) | flat part sheet thickness t (mm) | Gap height x (mm) | x/(T − t) | T − t | Thickness of Al—Fe alloy layer (μm) | Flatness | Corrosion resistance | Formability |
|---|---|---|---|---|---|---|---|---|---|---|---|
| 63 | Comparative Example | 2.6 | 3.6 | 2.3 | 1 | 0.77 | 1.3 | 1 | A+ | NG | B |
| 64 | Comparative Example | 2.4 | 3.6 | 2.3 | 1 | 0.77 | 1.3 | 1 | A+ | NG | A |

TABLE 2-4-continued

| No. | Classification | Layer thickness ratio of coating layer of flat part | convex part sheet thickness T (mm) | flat part sheet thickness t (mm) | Gap height x (mm) | x/(T − t) | T − t | Thickness of Al—Fe alloy layer (μm) | Flatness | Corrosion resistance | Formability |
|---|---|---|---|---|---|---|---|---|---|---|---|
| 65 | Comparative Example | 2 | 3.6 | 2.3 | 1 | 0.77 | 1.3 | 1 | A+ | NG | A |
| 66 | Comparative Example | 2.7 | 3.6 | 2.3 | 1 | 0.77 | 1.3 | 1 | A+ | NG | A+ |
| 67 | Comparative Example | 2.5 | 3.6 | 2.3 | 1 | 0.77 | 1.3 | 1 | A+ | A+ | NG |
| 68 | Comparative Example | 2.6 | 3.6 | 2.3 | 1 | 0.77 | 1.3 | 1 | A+ | NG | A |
| 69 | Comparative Example | 2.6 | 3.6 | 2.3 | 1 | 0.77 | 1.3 | 1 | A+ | NG | A |
| 70 | Comparative Example | 2.4 | 3.6 | 2.3 | 1 | 0.77 | 1.3 | 1 | A+ | NG | A |
| 71 | Comparative Example | 2.6 | 3.6 | 2.3 | 1 | 0.77 | 1.3 | 1 | A+ | NG | A |
| 72 | Comparative Example | 2.2 | 3.6 | 2.3 | 1 | 0.77 | 1.3 | 1 | A+ | NG | A |
| 73 | Comparative Example | 2.6 | 3.6 | 2.3 | 1 | 0.77 | 1.3 | 1 | A+ | NG | A |
| 74 | Comparative Example | 2.6 | 3.6 | 2.3 | 1 | 0.77 | 1.3 | 1 | A+ | NG | A |
| 75 | Comparative Example | 2.8 | 3.6 | 2.3 | 1 | 0.77 | 1.3 | 1 | A+ | NG | A |
| 76 | Comparative Example | 2.6 | 3.6 | 2.3 | 1 | 0.77 | 1.3 | 1 | A+ | NG | A |
| 77 | Comparative Example | 2.5 | 3.6 | 2.3 | 1 | 0.77 | 1.3 | 1 | A+ | NG | A |
| 78 | Comparative Example | 2.6 | 3.6 | 2.3 | 1 | 0.77 | 1.3 | 1 | A+ | NG | A |
| 79 | Comparative Example | 2.6 | 3.6 | 2.3 | 1 | 0.77 | 1.3 | 1 | A+ | NG | A |
| 80 | Comparative Example | 2.6 | 3.6 | 2.3 | 1 | 0.77 | 1.3 | 1 | A+ | NG | A |
| 81 | Comparative Example | 2.3 | 3.6 | 2.3 | 1 | 0.77 | 1.3 | 1 | A+ | NG | A |
| 82 | Comparative Example | 2.6 | 3.6 | 2.3 | 1 | 0.77 | 1.3 | 1 | A+ | NG | A |
| 83 | Comparative Example | 2.7 | 3.6 | 2.3 | 1 | 0.77 | 1.3 | 1 | A+ | NG | A |
| 84 | Comparative Example | 2.4 | 3.6 | 2.3 | 1 | 0.77 | 1.3 | 1 | A+ | NG | A |
| 85 | Comparative Example | 2.1 | 3.6 | 2.3 | 1 | 0.77 | 1.3 | 1 | A+ | NG | A |
| 86 | Comparative Example | 2.6 | 3.6 | 2.3 | 1 | 0.77 | 1.3 | 1 | A+ | NG | A |
| 87 | Comparative Example | 2.6 | 3.6 | 2.3 | 1 | 0.77 | 1.3 | 1 | A+ | NG | A |
| 88 | Comparative Example | 2.8 | 3.6 | 2.3 | 1 | 0.77 | 1.3 | 1 | A+ | NG | A |
| 89 | Comparative Example | 2.6 | 3.6 | 2.3 | 1 | 0.77 | 1.3 | 1 | A+ | NG | A |
| 90 | Comparative Example | 2.5 | 3.6 | 2.3 | 1 | 0.77 | 1.3 | 1 | A+ | NG | A |
| 91 | Comparative Example | 2.7 | 3.6 | 2.3 | 1 | 0.77 | 1.3 | 1 | A+ | NG | A |
| 92 | Comparative Example | 2.2 | 3.6 | 2.3 | 1 | 0.77 | 1.3 | 8 | A+ | NG | NG |
| 93 | Comparative Example | 2.6 | 3.6 | 2.3 | 1 | 0.77 | 1.3 | 1 | A+ | NG | A |
| 94 | Comparative Example | 2.6 | 3.6 | 2.3 | 1 | 0.77 | 1.3 | 1 | A+ | NG | A |
| 95 | Comparative Example | 2.7 | 3.6 | 2.3 | 1 | 0.77 | 1.3 | 1 | A+ | NG | A |
| 96 | Comparative Example | 2.6 | 3.6 | 2.3 | 1 | 0.77 | 1.3 | 1 | A+ | NG | A |
| 97 | Comparative Example | 5.5 | 3.6 | 2.3 | 3.2 | 2.46 | 1.3 | 1 | NG | NG | NG |
| 98 | Comparative Example | 5.3 | 3.6 | 2.3 | 4.2 | 3.23 | 1.3 | 1 | NG | NG | NG |
| 99 | Comparative Example | 5.4 | 3.6 | 2.3 | 3.9 | 3.00 | 1.3 | 1 | NG | NG | NG |
| 100 | Comparative Example | 6 | 3.6 | 2.3 | 4.6 | 3.54 | 1.3 | 1 | NG | NG | NG |
| 101 | Comparative Example | 5.2 | 3.6 | 2.3 | 2.3 | 1.77 | 1.3 | 2.5 | NG | NG | NG |
| 102 | Comparative Example | 7.1 | 5.3 | 2.3 | 5.3 | 1.8 | 3 | 1 | NG | NG | NG |
| 103 | Comparative Example | 5.5 | 3.6 | 2.3 | 3.5 | 2.7 | 1.3 | 1 | NG | NG | NG |
| 104 | Comparative Example | 5.4 | 3.6 | 2.3 | 4.1 | 3.2 | 1.3 | 1 | NG | NG | NG |
| 105 | Comparative Example | 5.4 | 3.6 | 2.3 | 3.7 | 2.8 | 1.3 | 2.5 | NG | NG | NG |

From the above results, it is found that Examples corresponding to the coated checkered steel sheet according to the present disclosure are superior in flatness, corrosion resistance, and formability to Comparative Examples.

Test No. 97 (Comparative Example) is an example in which a heating ultimate temperature before coating is as high as 850° C. or higher.

Test No. 98 (Comparative Example) is an example in which the heating rate before coating is as high as 30° C./s.

Test No. 99 (Comparative Example) is an example in which the cooling rate after heating before coating is as high as 30° C./s.

Test No. 100 (Comparative Example) is an example in which the heating rate before coating and the cooling rate after heating before coating are as high as 30° C./s.

Test No. 101 (Comparative Example) is an example in which the cooling rate after coating is as high as 30° C./s.

Test No. 102 (Comparative Example) is an example in which the T−t is as large as the sheet thickness t or more.

Test Examples No. 103 (Comparative Example) to No. 105 (Comparative Example) are examples in which the heating rate before coating, the cooling rate after heating before coating, and the cooling rate after coating are low.

All of Test Nos. 97 to 103 satisfied the composition of the coating layer according to the present disclosure, but the layer thickness ratio of the coating layer of the flat part and the "x/(T−t)" value were large, and the flatness, the corrosion resistance, and the formability were deteriorated.

Preferred embodiments and examples according to the present disclosure have been described in detail with reference to the accompanying drawings. However, the disclosure is not limited to such examples. It is obvious that those having ordinary skill in the art to which the disclosure belongs can conceive various changes or modifications within the scope of the technical concepts described in the claims, and it should be understood that these changes or modifications also fall within the technical scope of the disclosure.

The entire disclosure of Japanese Patent Application No. 2021-064721 is incorporated herein by reference.

All the documents, patent applications, and technical standards cited in this specification are incorporated herein by reference to the same extent as when each individual document, patent application, or technical standard is specifically and individually indicated to be incorporated by reference.

The invention claimed is:

1. A Zn—Al—Mg alloy coated checkered steel sheet, comprising:
   a substrate checkered steel sheet having a convex part and a flat part on one sheet surface; and
   a coating layer including a Zn—Al—Mg alloy layer disposed on the sheet surface of the substrate checkered steel sheet having the convex part and the flat part,
   wherein the coating layer has a chemical composition containing, in % by mass:
   Zn: greater than 65.0%,
   Al: from greater than 1.0% to less than 25.0%,
   Mg: from greater than 1.0% to less than 12.5%,
   Sn: from 0% to 5.0%,
   Bi: from 0% to less than 5.0%,
   In: from 0% to less than 2.0%,
   Ca: from 0% to 3.00%,
   Y: from 0% to 0.5%,
   La: from 0% to less than 0.5%,
   Ce: from 0% to less than 0.5%,
   Si: from 0% to less than 2.5%,
   Cr: from 0% to less than 0.25%,
   Ti: from 0% to less than 0.25%,
   Zr: from 0% to less than 0.25%,
   Mo: from 0% to less than 0.25%,
   W: from 0% to less than 0.25%,
   Ag: from 0% to less than 0.25%,
   P: from 0% to less than 0.25%,
   Ni: from 0% to less than 0.25%,
   Co: from 0% to less than 0.25%,
   V: from 0% to less than 0.25%,
   Nb: from 0% to less than 0.25%,
   Cu: from 0% to less than 0.25%,
   Mn: from 0% to less than 0.25%,
   Li: from 0% to less than 0.25%,
   Na: from 0% to less than 0.25%,
   K: from 0% to less than 0.25%,
   Fe: from 0% to 5.0%,
   Sr: from 0% to less than 0.5%,
   Sb: from 0% to less than 0.5%,
   Pb: from 0% to less than 0.5%,
   B: from 0% to less than 0.5%, and
   impurities,
   wherein, when observing a cross section of cutting edge orthogonal to a longitudinal direction of the convex part and taken along a sheet thickness direction at a central part in the longitudinal direction of the convex part, a layer thickness ratio of the coating layer of the flat part on left and right sides of the convex part (layer thickness of left coating layer/layer thickness of right coating layer) is from 0.2 to 5.0, and
   wherein a convex height T-t, where T is a sheet thickness of the substrate checkered steel sheet at the convex part and t is a sheet thickness of the substrate checkered steel sheet at the flat part, and a gap height x between a stationary surface and a sheet surface of the coated checkered steel sheet opposing the stationary surface in a case in which the coated checkered steel sheet is placed in a stationary position, satisfy the following Formulae 1 and 2 below:

$$x/(T-t) \leq 1.5 \qquad \text{Formula 1:}$$

$$0.5 < T-t \leq t \qquad \text{Formula 2:}$$

wherein, in Formula 1 and Formula 2, units of the sheet thickness T, t, and the gap height x of the substrate checkered steel sheet are millimeters.

2. The Zn—Al—Mg alloy coated checkered steel sheet according to claim 1, wherein the Al concentration is greater than 5.0% and less than 25.0%, and the Mg concentration is greater than 3.0% and less than 12.5%.

3. The Zn—Al—Mg alloy coated checkered steel sheet according to claim 1, wherein the coating layer includes an Al—Fe alloy layer between the substrate checkered steel sheet and the Zn—Al—Mg alloy layer.

4. The Zn—Al—Mg alloy coated checkered steel sheet according to claim 2, wherein the coating layer includes an Al—Fe alloy layer between the substrate checkered steel sheet and the Zn—Al—Mg alloy layer.

* * * * *